US012582022B2

(12) United States Patent
Wonderlich et al.

(10) Patent No.: US 12,582,022 B2
(45) Date of Patent: Mar. 24, 2026

(54) SYSTEM AND METHOD FOR SEED QUALITY MEASUREMENT AND CONTROL

(71) Applicant: Deere & Company, Moline, IL (US)

(72) Inventors: Grant J. Wonderlich, Milan, IL (US); Zimin W. Vilar, Dubuque, IA (US); Bradley W. Van De Woestyne, West Des Moines, IA (US); Timothy A. Wilcox, Cissna Park, IL (US)

(73) Assignee: DEERE & COMPANY, Moline, IL (US)

( * ) Notice: Subject to any disclaimer, the term of this patent is extended or adjusted under 35 U.S.C. 154(b) by 533 days.

(21) Appl. No.: 18/168,118

(22) Filed: Feb. 13, 2023

(65) Prior Publication Data

US 2024/0268252 A1     Aug. 15, 2024

(51) Int. Cl.
| | |
|---|---|
| *A01B 79/00* | (2006.01) |
| *A01C 5/06* | (2006.01) |
| *A01C 7/10* | (2006.01) |
| *H04W 4/46* | (2018.01) |

(52) U.S. Cl.
CPC .............. *A01B 79/005* (2013.01); *A01C 5/06* (2013.01); *A01C 7/105* (2013.01); *H04W 4/46* (2018.02)

(58) Field of Classification Search
CPC ......... A01B 79/005; A01C 5/06; A01C 7/105; H04W 4/46
See application file for complete search history.

(56) References Cited

U.S. PATENT DOCUMENTS

| | | | | |
|---|---|---|---|---|
| 9,807,923 | B2 * | 11/2017 | Wilhelmi | A01C 21/00 |
| 2015/0094917 | A1 * | 4/2015 | Blomme | A01C 5/062 |
| | | | | 701/50 |
| 2019/0230846 | A1 * | 8/2019 | Koch | A01C 7/201 |
| 2020/0390026 | A1 * | 12/2020 | Walter | A01C 7/102 |
| 2022/0039310 | A1 * | 2/2022 | Johnson | A01C 1/06 |
| 2024/0306534 | A1 * | 9/2024 | Frank | G01N 15/147 |

OTHER PUBLICATIONS

Corn Yield Estimates, Iowa State University, https://crops.extension.iastate.edu/encyclopedia/corn-yield-estimates, Oct. 2020, 4 pages.
Multispectral and X-ray Images for Characterization of *Jatropha ouras* L. Seed Quality, https://doi.org/10.1186/s13007-021-00709-6, 2001, 13 pages.
Estimating Soybean Yield, University of Kentucky, Issue Dec. 2005, 2 pages.
Extended European Search Report and Written Opinion issued in European Patent Application No. 24154916.1 dated Jul. 5, 2024, in 11 pages.

* cited by examiner

*Primary Examiner* — Matthew R Buck
(74) *Attorney, Agent, or Firm* — Christopher J. Volkmann; KELLY, HOLT & CHRISTENSON PLLC

(57) ABSTRACT

An agricultural planting machine includes a row unit that opens a furrow in a field at which the agricultural planting machine operates and a seed supply system that delivers a seed to the furrow. The agricultural planting machine further includes one or more seed quality sensors that observe the seed as the seed is within the seed supply system and generate sensor data indicative of the quality of the seed. The agricultural planting machine additionally includes a control system that generates seed quality value indicative of a quality of the seed based on the sensor data indicative of the quality of the seed and generates a control signal based on the seed quality value.

18 Claims, 18 Drawing Sheets

SEED REMOVAL SUBSYSTEM
350

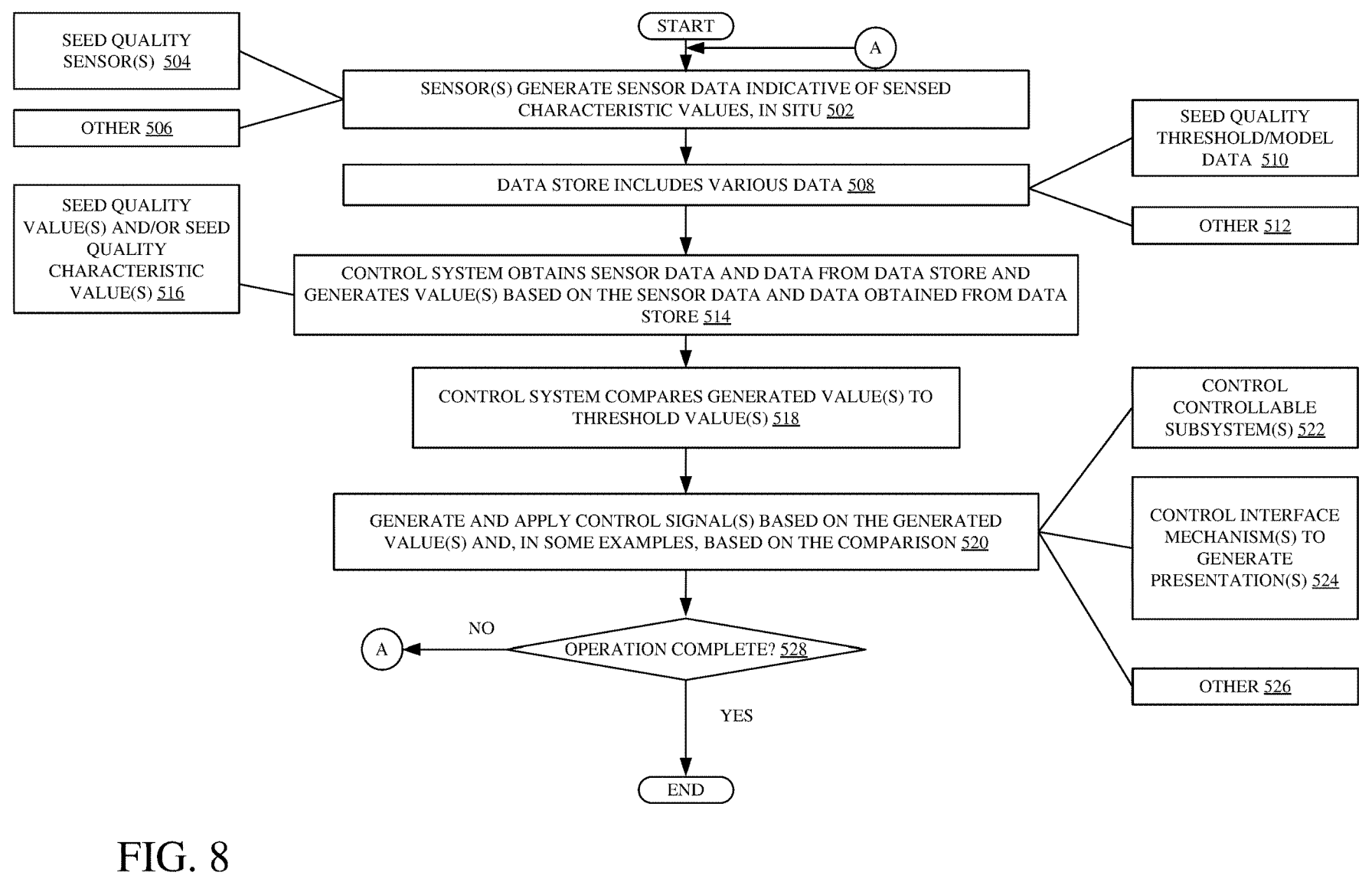

SEED QUALITY THRESHOLD/MODEL DATA 510

OTHER 512

CONTROL CONTROLLABLE SUBSYSTEM(S) 522

CONTROL INTERFACE MECHANISM(S) TO GENERATE PRESENTATION(S) 524

OTHER 526

START

A

SENSOR(S) GENERATE SENSOR DATA INDICATIVE OF SENSED CHARACTERISTIC VALUES, IN SITU 502

DATA STORE INCLUDES VARIOUS DATA 508

CONTROL SYSTEM OBTAINS SENSOR DATA AND DATA FROM DATA STORE AND GENERATES VALUE(S) BASED ON THE SENSOR DATA AND DATA OBTAINED FROM DATA STORE 514

CONTROL SYSTEM COMPARES GENERATED VALUE(S) TO THRESHOLD VALUE(S) 518

GENERATE AND APPLY CONTROL SIGNAL(S) BASED ON THE GENERATED VALUE(S) AND, IN SOME EXAMPLES, BASED ON THE COMPARISON 520

OPERATION COMPLETE? 528

NO

A

YES

END

SEED QUALITY SENSOR(S) 504

OTHER 506

SEED QUALITY VALUE(S) AND/OR SEED QUALITY CHARACTERISTIC VALUE(S) 516

FIG. 8

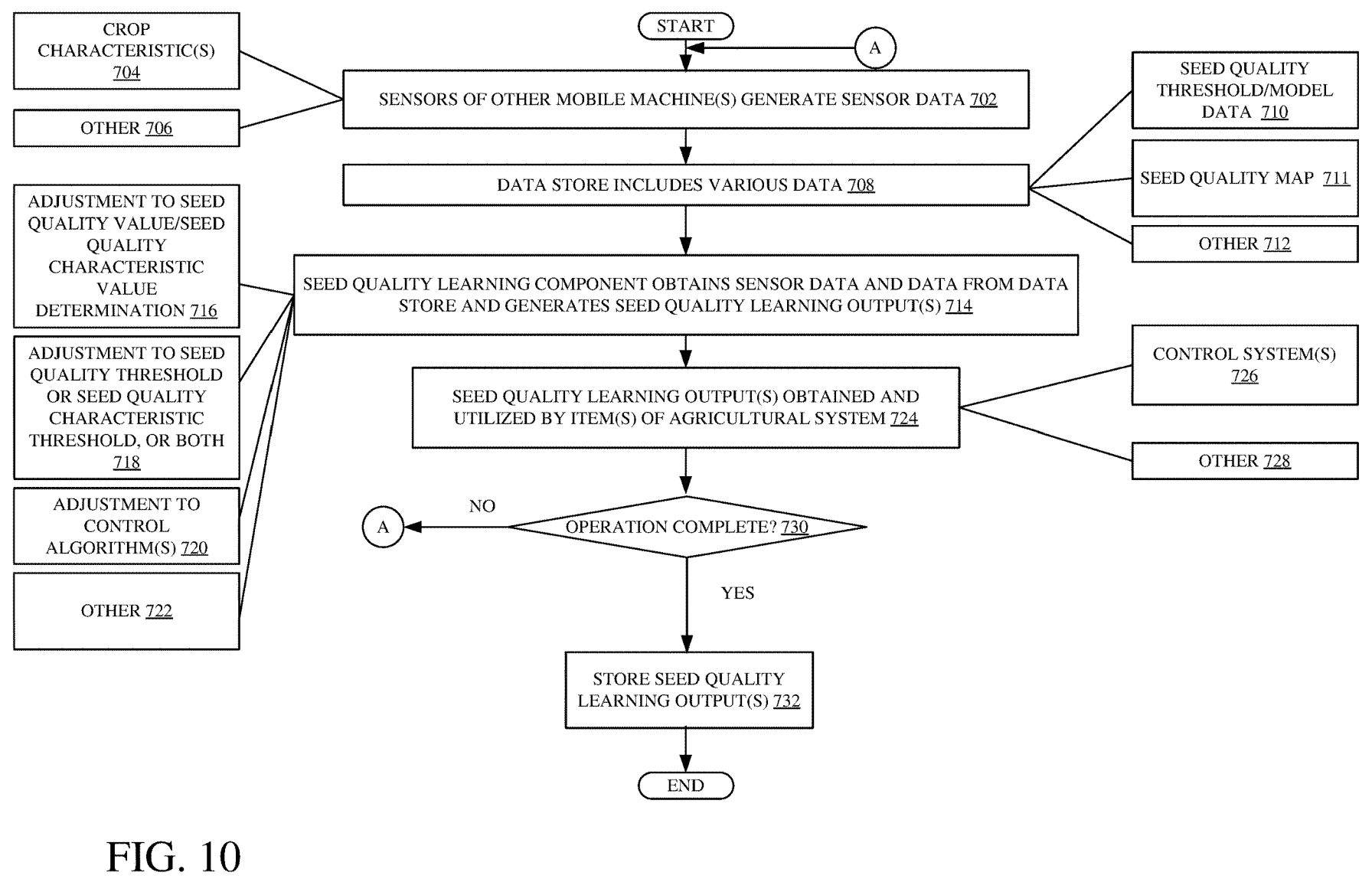

SEED QUALITY THRESHOLD/MODEL DATA 710

SEED QUALITY MAP 711

OTHER 712

CONTROL SYSTEM(S) 726

OTHER 728

START

A

SENSORS OF OTHER MOBILE MACHINE(S) GENERATE SENSOR DATA 702

CROP CHARACTERISTIC(S) 704

OTHER 706

DATA STORE INCLUDES VARIOUS DATA 708

SEED QUALITY LEARNING COMPONENT OBTAINS SENSOR DATA AND DATA FROM DATA STORE AND GENERATES SEED QUALITY LEARNING OUTPUT(S) 714

ADJUSTMENT TO SEED QUALITY VALUE/SEED QUALITY CHARACTERISTIC VALUE DETERMINATION 716

ADJUSTMENT TO SEED QUALITY THRESHOLD OR SEED QUALITY CHARACTERISTIC THRESHOLD, OR BOTH 718

ADJUSTMENT TO CONTROL ALGORITHM(S) 720

OTHER 722

SEED QUALITY LEARNING OUTPUT(S) OBTAINED AND UTILIZED BY ITEM(S) OF AGRICULTURAL SYSTEM 724

OPERATION COMPLETE? 730

NO

A

YES

STORE SEED QUALITY LEARNING OUTPUT(S) 732

END

FIG. 10

SYSTEM AND METHOD FOR SEED QUALITY MEASUREMENT AND CONTROL

FIELD OF THE DESCRIPTION

The present description generally relates to agricultural systems. More specifically, but not by limitation, the present description relates to an agricultural system that is configured to sense and track seed quality and subsequently control one or more machines in current or subsequent operations based thereon.

BACKGROUND

There are a wide variety of different types of agricultural seeding or planting machines. They can include row crop planters, grain drills, air seeders or the like. These machines place seeds at a desired depth within a plurality of parallel seed trenches that are formed in the soil. Thus, these machines can carry one or more seed hoppers. The mechanisms that are used for moving the seed from the seed hopper to the ground often include a seed metering system and a seed delivery system.

The discussion above is merely provided for general background information and is not intended to be used as an aid in determining the scope of the claimed subject matter.

SUMMARY

An agricultural planting machine includes a row unit that opens a furrow in a field at which the agricultural planting machine operates and a seed supply system that delivers a seed to the furrow. The agricultural planting machine further includes one or more seed quality sensors that observe the seed as the seed is within the seed supply system and generate sensor data indicative of the quality of the seed. The agricultural planting machine additionally includes a control system that generates seed quality value indicative of a quality of the seed based on the sensor data indicative of the quality of the seed and generates a control signal based on the seed quality value.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 8 shows a flow diagram illustrating one example of operation of an agricultural system in detecting seed quality or seed quality characteristics, or both, and control based on detected seed quality or seed quality characteristics, or both.

FIG. 10 shows a flow diagram illustrating one example of operation of an agricultural system in generating a seed quality learning output.

DETAILED DESCRIPTION

Figure 1:
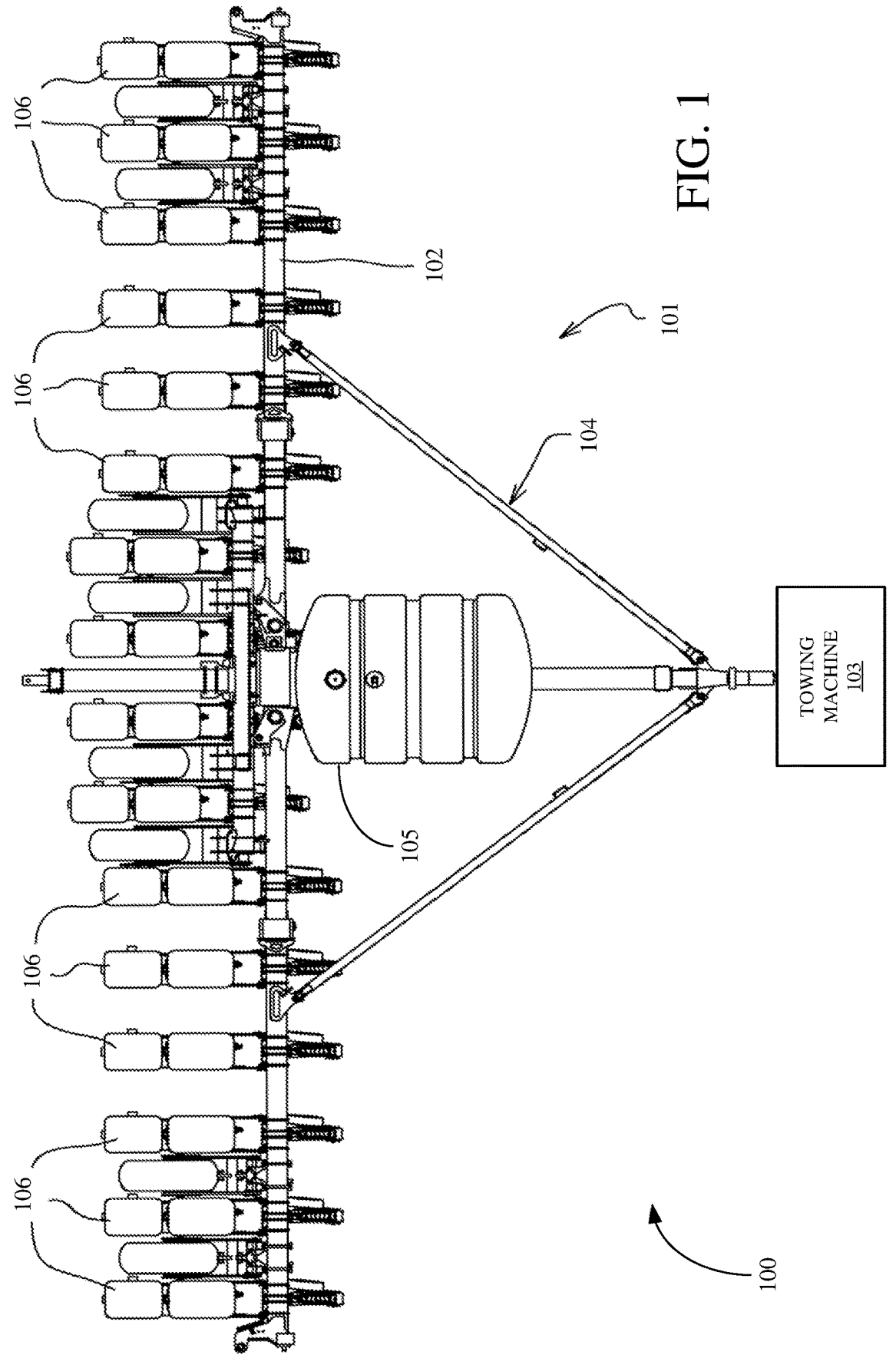
FIG. 1 shows one example of a top view of an agricultural machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, instruments system, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

The quality (or viability) of a seed may have an effect on resultant yield produced by the seed. For example, higher quality seeds may produce more yield as compared to relatively lower quality seeds. Various characteristics of the seed may impact or be indicative of the quality of the seed. These quality characteristics can include, for example, but not by limitation, the shape (e.g., flat, round, etc.) of the seed, the size of the seed (e.g., mass, volume, and dimensions, such as length, width, and thickness, etc.), the orientation of the seed (e.g., the seed may be oriented vertically, horizontally, diagonally, etc., relative to a point of reference, such as the ground, for instance it may be desirable to have the seed orientated such that a portion of the seed, such as the germ or radicle, as planted, will be near the bottom of the furrow and/or facing an adjacent row) the moisture of the seed (e.g., percent moisture content), the nutrient content of the seed (e.g., percent protein content, etc.), seed damage (e.g., damage due to mishandling, pests/insects, moisture, environmental conditions, etc. which can, seed genotype (e.g., refuge seed v. genetically modified seed), seed temperature, as well as various other quality characteristics.

During a planting operation, it would be useful to determine if a seed is viable (that is of sufficient quality, such as sufficient relative to a threshold) to ensure that only viable seeds are planted thereby increasing yields and efficiency. In other examples, it may be useful to track the quality of seeds planted to control later operations, such as the application of materials (e.g., insecticide, herbicide, fertilizer, water, etc.), as well as to learn from resultant yields to adjust control algorithms in subsequent planting operations. In some known systems, sensors may be used to detect seed quality in a lab setting or at a seed provider. However, the quality of the seed may deteriorate during storage of the seed or after delivery from the lab or seed provider. During planting operations of a planter, the real-time detection of seed quality on a planter, and subsequent control based thereon, can present timing and other technical problems. Further, techniques that simply view or sense an exterior of a seed may not detect issues within the seed during plating. Thus, there is a need for an improved system and method for detecting and tracking individual seed quality (or viability) with a planter or row planting unit.

FIG. 1 is a top view of one example of an agricultural planting machine 100. Agricultural planting machine 100 illustratively includes a planting implement 101 and a towing machine 103. As illustrated in FIG. 1. Planting implement 101 can be coupled to and towed behind a towing machine 103, such as a tractor. Planting implement 101 includes a toolbar 102 that is part of a frame 104. Planting implement 101 can include one or more material tanks 105 which hold one or more materials (e.g., fertilizer, pesticide, insecticide, herbicide, etc.) to be applied to the field. FIG. 1 also shows that a plurality of row units 106 are mounted to the toolbar.

Figure 2:
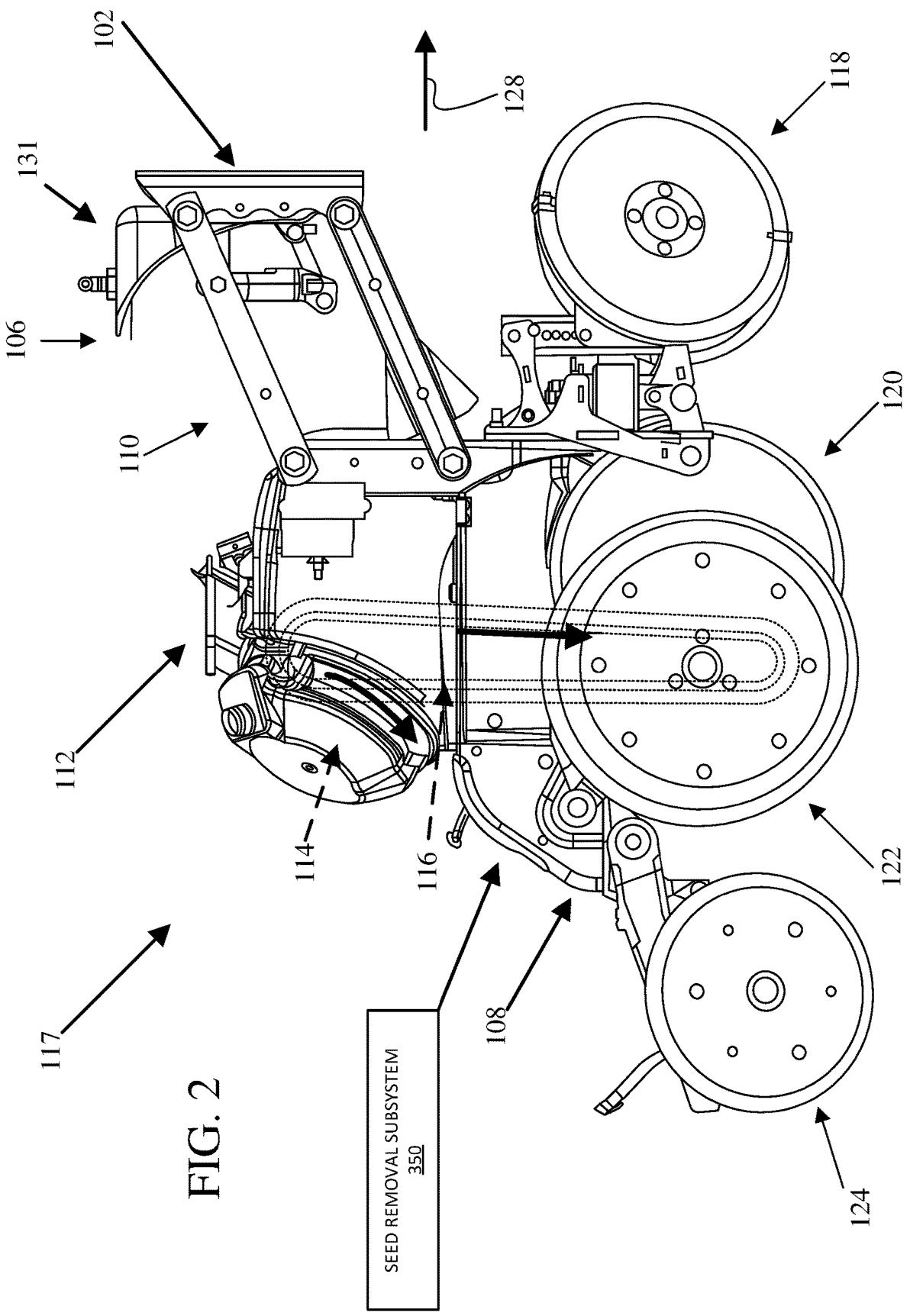
FIG. 2 shows one example of a side view of a row unit of the agricultural machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

Row unit 106 also illustratively has a seed hopper 112 that stores seed. The seed is provided from a hopper 112 to a seed metering system 114 that meters the seed and provides the metered seed to a seed delivery system 116 that delivers the seed from the seed metering system 114 to the furrow or trench generated by the row unit. The seed hopper 112, the seed metering system 114, and the seed delivery system 116 are all components of a seed supply system 117. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, a furrow opener 120, a set of gauge wheels 122, and a set of closing wheels 124. It can also include an additional hopper that can be used to provide additional material, such as a fertilizer or another chemical.

In operation, as row unit 106 moves in the direction generally indicated by arrow 128, row cleaner 118 generally cleans the row ahead of the opener 120 to remove debris (such as plant debris from the previous growing season) and the opener 120 opens a furrow in the soil. Gauge wheels 122 illustratively control a depth of the furrow, and seed is metered by seed metering system 114 and delivered to the furrow by seed delivery system 116. Closing wheels 124 close the trench over the seed. A downforce generator 131 can also be provided to controllably exert downforce to keep the row unit in desired engagement with the soil.

FIG. 2 also illustrates that agricultural planting machine 100, or each row unit 106, can include a seed removal subsystem 250. Seed removal subsystem 250 is controllably operable to remove seeds from a seed stream (e.g., the stream of seeds shown in FIGS. 4A-B) provided by the planting machine 100 such that the removed seeds are not deposited in furrows opened by the planting machine 100. For example, where each row unit 106 includes a seed removal subsystem 250, that respective seed removal subsystem 250 is controllably operable to remove seeds such that they are not deposited in a furrow opened by the respective row unit 106. The seed removal subsystem 250 (or component(s) thereof) can be placed at various locations within planting machine 100, or within each row unit 106, for example in metering system 114, in seed delivery system 116, or at an outlet end of seed metering system 116. Seed removal subsystem 250, in one example, may include, among other things, a source (e.g., compressor/pump and storage volume) of compressed fluid (e.g., compressed air), a device (e.g., valve or nozzle, or both) through which the compressed fluid travels and exits to be applied to a seed, as well as appropriate conduits (e.g., tubes, hosing, etc.) to carry the compressed fluid from the source to the device. The device may be controllably actuatable to release a stream of compressed fluid which acts against the seed to prevent the seed from being deposited in a furrow. The compressed fluid may direct the seed in a direction and/or out of a seed delivery stream. This is merely one example of a seed removal subsystem 250. Additionally, once a seed is removed, the speed of the seed metering system 114 or seed delivery system 116, or both, can be controlled (e.g., increased) such that a subsequent seed takes the place (or approximately takes the place) of a removed seed.

Figure 3:
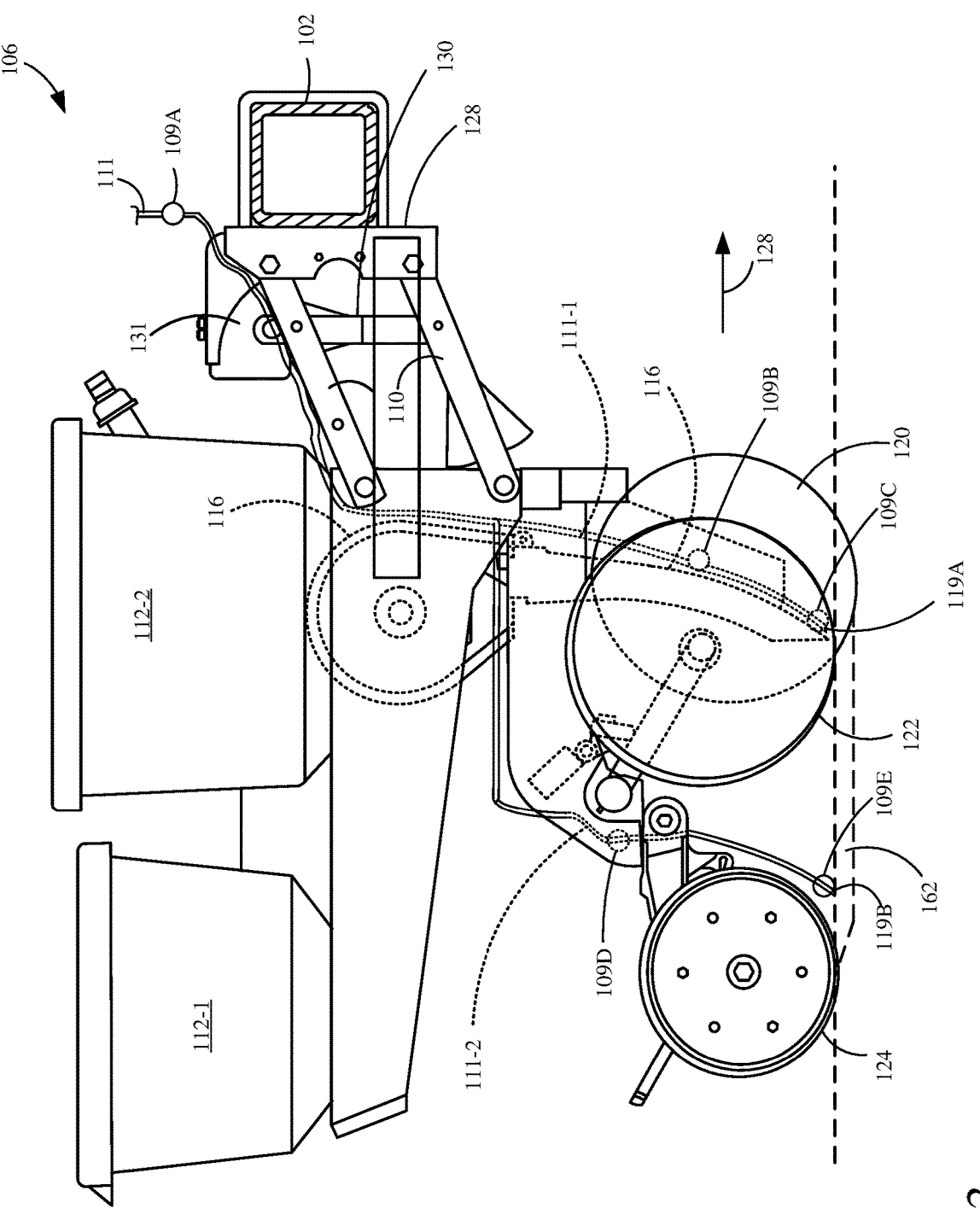
FIG. 3 shows one example of a side view of a row unit of the agricultural machine shown in FIG. 1

FIG. 3 is a side view showing one example of a row unit 106 in more detail. FIG. 3 is similar to FIG. 2 and thus similar items are numbered similarly. FIG. 3 shows that, in some examples, row unit 106 can include a material application system that delivers a material (e.g., fertilizer, pesticide, insecticide, herbicide, etc.) to the field (e.g., in the furrow or adjacent to the furrow). The material application system can include a fluid line 111 and one or more devices 109 which can be controlled to control the application of material to the field. The fluid line 111 receives material from a material tank 105 and carries the material to a distal end 119 through which the material exits the fluid line 111 to be delivered to the field. FIG. 3 shows two example arrangements of fluid line 111 (111-1 and 111-2). A first example fluid line 111-1 is disposed such that its distal end 119A is ahead of an outlet end of seed delivery system 116, relative to the direction of travel. A second example fluid line 111-2 is disposed such that its distal end 119B is behind an outlet end of seed delivery system 116, relative to the direction of travel. The devices 109 can comprise actuatable valves or nozzles which can be controllably actuated to control the application of the material. A device 109 can be placed at various locations along the fluid line 111 as shown in FIG. 1. In some examples, a device 109 can be located proximate to, collocated with, or form distal end 119 (as illustrated by devices 109C and 109E). In some examples, a device can be located further from the distal end 119, at some position along the length of fluid line 111 (as illustrated by devices 109A, 109B, and 109D). In some examples, the material application system can include multiple devices 109, such as a device 109 (e.g., 109C or 109E) proximate to, collocated with, or forming a distal end 119 as well as a device 109 (e.g., 109A, 109B, or 109D) further from the distal end. These are merely some examples. In some examples, the material application system can include other items, for example, one or more conveyance mechanisms (e.g., pumps, metering devices, etc.) that cause or assist the conveyance of the material along fluid line 111.

Figure 4:
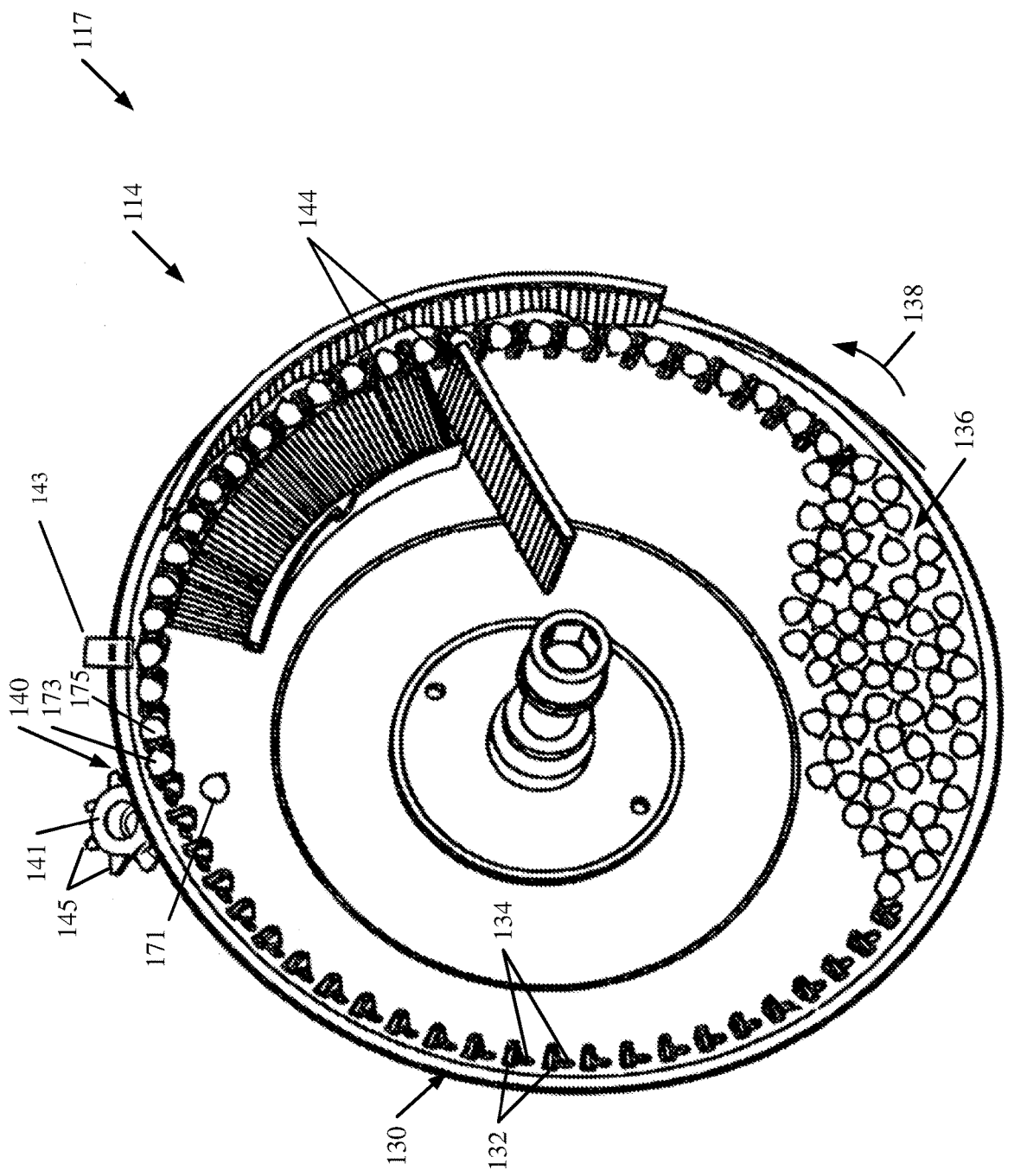
FIG. 4 is a perspective view of a portion of a seed metering system.

FIG. 4 shows one example of a rotatable mechanism that can be used as part of the seed metering system 114. The rotatable mechanism includes a rotatable disc, or concave element, 130. Rotatable element 130 has a cover (not shown) and is rotatably mounted relative to the frame 108 of the row unit 106. Rotatable element 130 is driven by a motor (shown in FIG. 6) and has a plurality of projections or tabs 132 that are closely proximate corresponding apertures 134. A seed pool 136 is disposed generally in a lower portion of an enclosure formed by rotating mechanism 130 and its corresponding cover. Mechanism 130 is rotatably driven by its machine (such as an electric motor, a pneumatic motor, a hydraulic motor, etc.) for rotation generally in the direction indicated by arrow 138, about a hub. A pressure differential is introduced into the interior of the metering mechanism so that the pressure differential influences seeds from seed pool 136 to be drawn to apertures 134. For instance, a vacuum can be applied to draw the seeds from seed pool 136 so that they come to rest in apertures 134, where the vacuum holds them in place. Alternatively, a positive pressure can be introduced into the interior of the metering mechanism to create a pressure differential across apertures 134 to perform the same function.

Once a seed comes to rest in (or proximate) an aperture 134, the vacuum or positive pressure differential acts to hold the seed within the aperture 134 such that the seed is carried upwardly generally in the direction indicated by arrow 138, from seed pool 136, to a seed discharge area 140. It may happen that multiple seeds are residing in an individual seed cell. In that case, a set of brushes or other members 144 that are located closely adjacent the rotating seed cells tend to remove the multiple seeds so that only a single seed is carried by each individual cell. Additionally, a sensor 143 is also illustratively mounted adjacent to rotating mechanism 130 as will be discussed in FIG. 6.

Once the seeds reach the seed discharge area 140, the vacuum or other pressure differential is illustratively removed, and a positive seed removal wheel, knock-out wheel 141, can act to remove the seed from the seed cell. Wheel 141 illustratively has a set of projections 145 that protrude at least partially into apertures 134 to actively dislodge the seed from those apertures. When the seed is dislodged, it is illustratively moved by the seed delivery system 116 (two examples of which are shown below in FIGS. 5A and 5B) to the furrow in the ground.

Figure 5A:
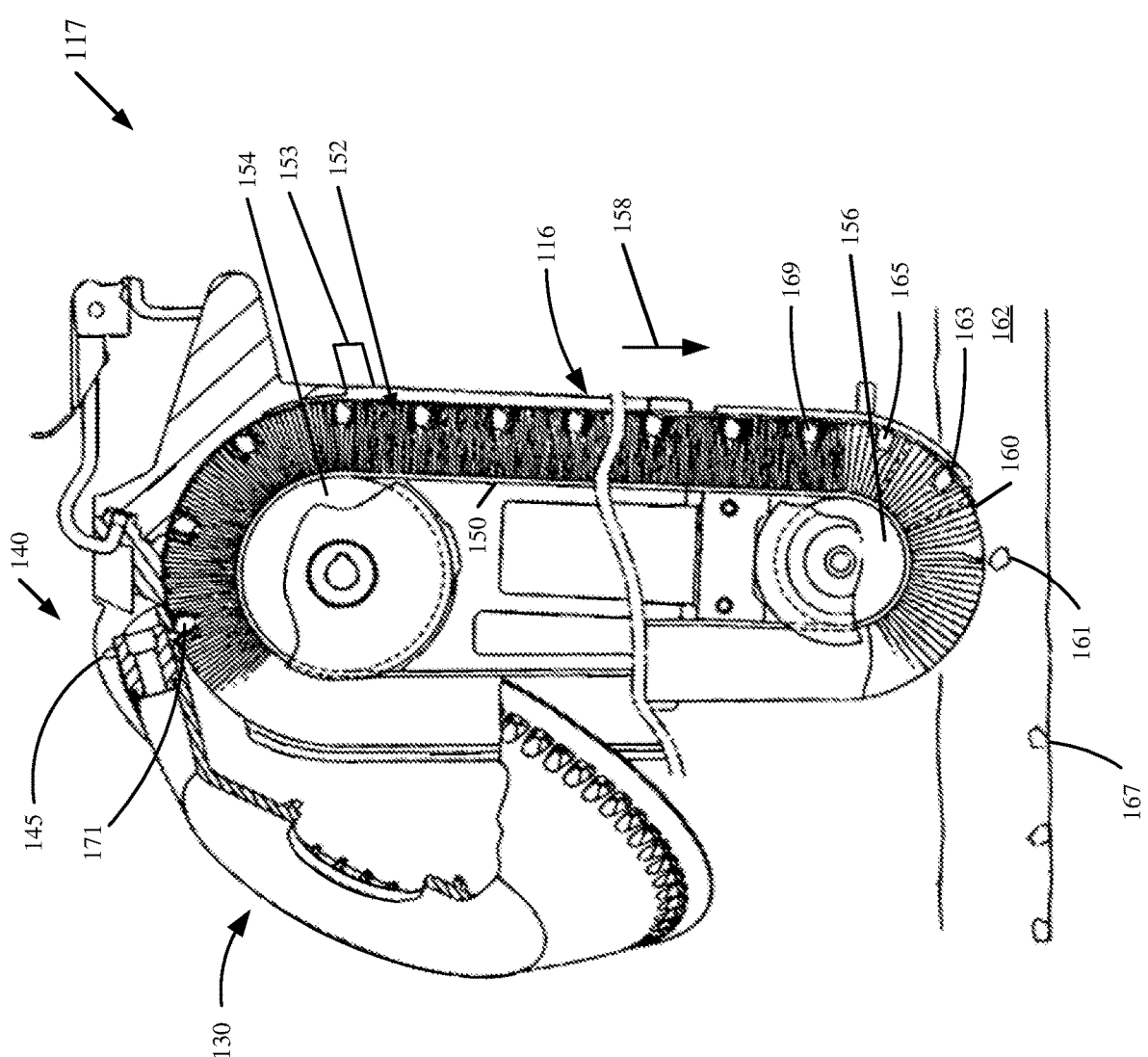
FIGS. 5A and 5B show two examples of different seed delivery systems that can be used with a seed metering system.

FIG. 5A shows an example where the rotating element 130 is positioned so that its seed discharge area 140 is above, and closely proximate, seed delivery system 116 which includes a seed transport mechanism. In the example shown in FIG. 5A, the seed transport mechanism includes a belt 150 with a brush that is formed of distally extending bristles 152 attached to belt 150. Belt 150 is mounted about pulleys 154 and 156. One of pulleys 154 and 156 is illustratively a drive pulley while the other is illustratively an idler pulley. The drive pulley is illustratively rotatably driven by a convey-ance motor (such as that shown in FIG. 6) which can be an electric motor, a pneumatic motor, a hydraulic motor, etc. Belt 150 is driven generally in the direction indicated by arrow 158.

Therefore, when seeds are moved by rotating element 130 to the seed discharge area 140, where they are discharged from the seed cells in rotating mechanism 130, they are illustratively positioned within the bristles (e.g., in a receiver) 152 by the projections 132 following each aperture that pushes the seed into the bristles. Seed delivery system 116 illustratively includes walls that form an enclosure around the bristles, so that, as the bristles move in the direction indicated by arrow 158, the seeds are carried along with them from the seed discharge area 140 of the metering mechanism, to a discharge area 160 either at ground level, or below ground level within a trench or furrow 162 that is generated by the furrow opener 120 on the row unit.

Additionally, a sensor 153 is also illustratively coupled to seed delivery system 116. As the seeds are moved within bristles 152, sensor 153 can detect the presence or absence of a seed as will be discussed below with respect to FIG. 6. It should also be noted that while the present description will proceed as having sensors 143 and 153, it is expressly contemplated that, in another example, only one sensor is used. Additional sensors can also be used, some of which will be described in FIG. 6. Additionally, sensors 143 and 153 could include multiple sensors or multiple sensors could be located at the locations at which sensors 143 and 153 are shown in FIGS. 4-5B, such as, but not limited to, one or more seed quality sensors 380.

Figure 5B:
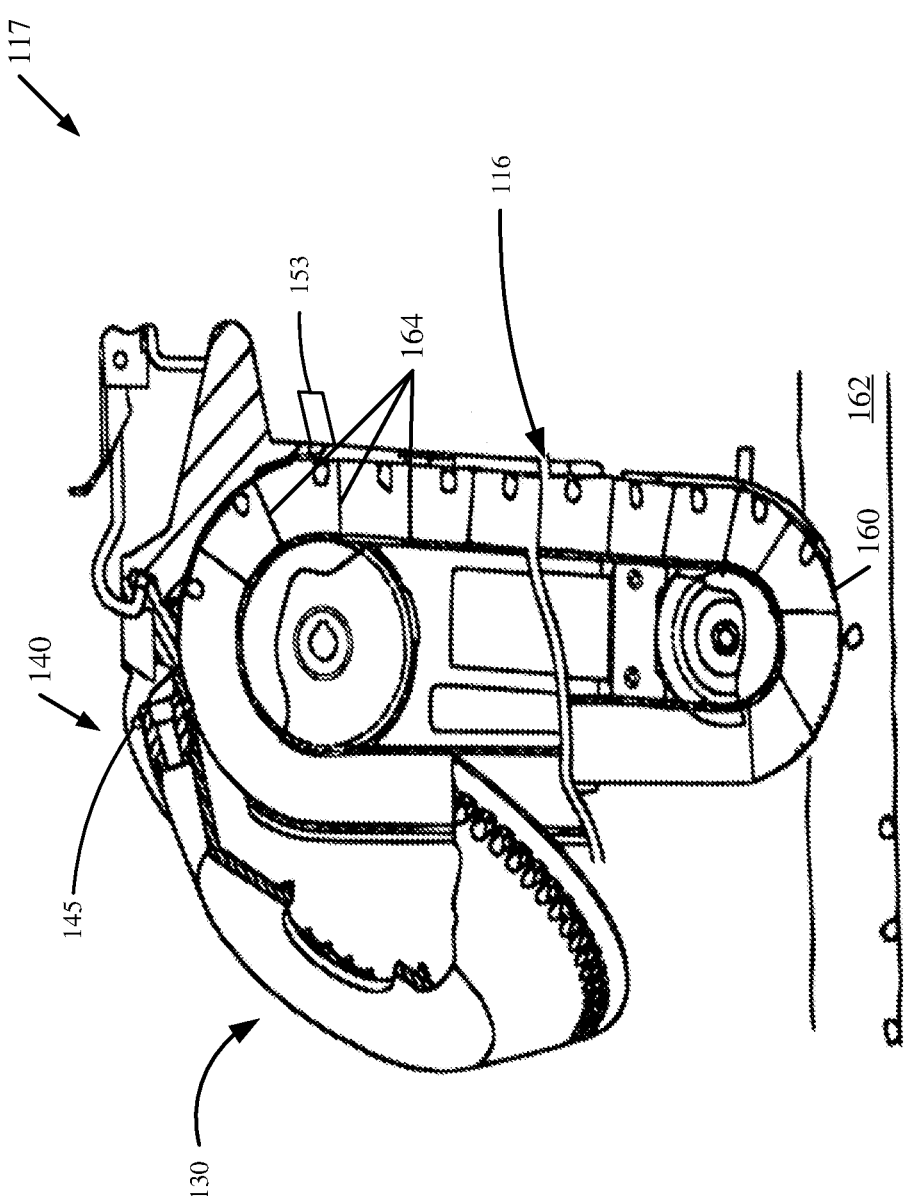

FIG. 5B is similar to FIG. 5A, except that seed delivery system 116 is not formed by a belt with distally extending bristles. Instead, the transport mechanism includes a flighted belt in which a set of paddles 164 form individual chambers (or receivers), into which the seeds are dropped, from the seed discharge area 140 of the metering mechanism. The flighted belt moves the seeds from the seed discharge area 140 to the discharge area 160 within the trench or furrow 162.

There are a wide variety of other types of delivery systems as well, that include a transport mechanism and a receiver that receives a seed. For instance, they include dual belt delivery systems in which opposing belts receive, hold and move seeds to the furrow, a rotatable wheel that has sprock-ets which catch seeds from the metering system and move them to the furrow, multiple transport wheels that operate to transport the seed to the furrow, an auger, among others. The present description will proceed with respect to a brush belt, but many other delivery systems are contemplated herein as well.

The present description provides an agricultural system that is configured to sense and track individual seed quality (or viability) as well as provide control based thereon.

Figure 6:
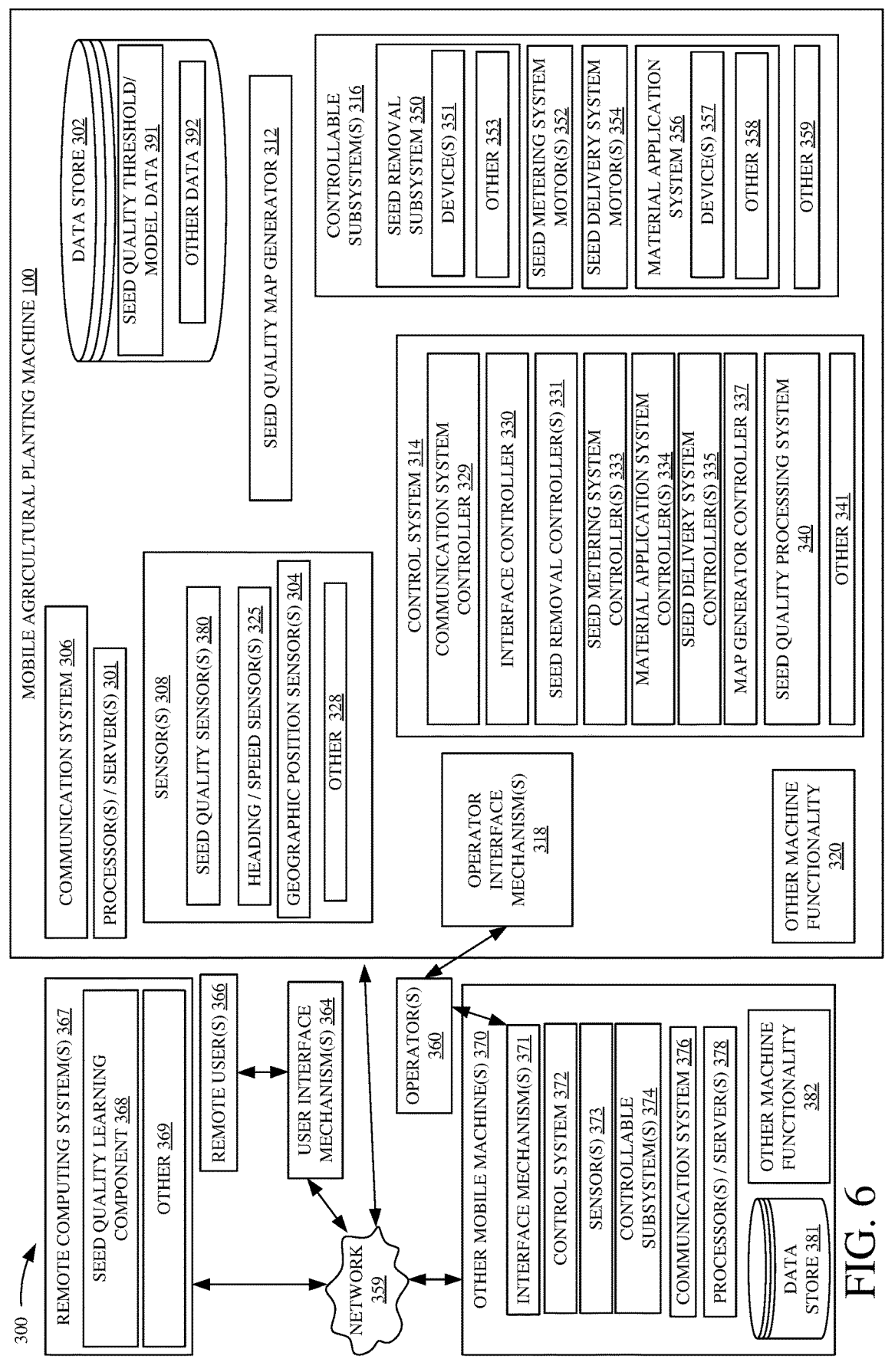
FIG. 6 is a block diagram showing some portions of an agricultural system, including one or more mobile machines, in more detail, according to some examples of the present disclosure.

FIG. 6 is a block diagram showing some portions of an agricultural system architecture 300 (also referred to herein as agricultural system 300). FIG. 6 shows that agricultural system 300 includes mobile planting machine 100 one or more remote computing systems 367, one or more remote user interfaces 364, network 359, and one or more other mobile machines 370.

Mobile planting machine 100, itself, illustratively includes one or more processors or servers 301, data store 302, communication system 306, and one or more sensors 308 that sense one or more characteristics at a worksite concurrent with an operation. The sensors 308 generate values corresponding to the sensed characteristics. Mobile machine 100 also includes a seed quality map generator 312, control system 314, one or more controllable subsystems 316, and an operator interface mechanism 318. The mobile machine 100 can also include a wide variety of other machine functionality 320.

Other machines 370, themselves, can include one or more operator interface mechanisms 371, a control system 372, one or more sensors 373, one or more controllable subsys-tems 374, a communication system 376, one or more processors or servers 378, a data store 381, and can also include a wide variety of other machine functionality 382.

Remote computing systems 367, themselves, can include seed quality learning component 368, and can include a wide variety of other functionality 369.

Data store 302 can include (or store) a variety of data. As illustrated in FIG. 6, data store 302 can include seed quality threshold and model data 391. Seed quality threshold and model data 391 can include seed quality threshold values that can be utilized by control system 314 in controlling mobile planting machine 100, such as by comparison of seed quality values detected during the operation of mobile machine 100 to the seed quality threshold value. Seed quality threshold and model data can include seed quality models (e.g., algorithms, machine learned models, non-machine learned models, functions, look up tables, expert knowledge, etc.) which can be used by control system 314 to determine and generate seed quality values or seed quality characteristic values, or both, based on sensor data generated by seed quality sensors 380 generated during the operation of mobile planting machine 100. Data store 302 can also include a variety of other data 392, such as, but not limited to, computer executable instructions that can be executed by one or more processors or servers, such as one or more processors or servers 301, to implement one or more other components of mobile planting machine 100 or implement the functionality of one or more other components of mobile planting machine 100. It will be understood that data store 381 can be similar to data store 302 and can include computer executable instructions that can be executed by one or more processors or servers, such as one or more processors or servers 378, to implement one or more other components of an other mobile machine 370 or implement the functionality of one or more other components of an other mobile machine 370.

Sensors 308 sense characteristics at a worksite during the course of an operation. Sensors 308 illustratively include one or more seed quality sensors 380, one or more heading/speed sensors 325, one or more geographic position sensors 304, and can include various other sensors 328, including, but not limited to, other sensors discussed in previous figures.

Seed quality sensors 380 sense various seed quality (or seed vigor) characteristics such as, but not limited to, seed shape, seed size, seed orientation, seed moisture, seed nutrient content (e.g., seed nutrient concentration), seed damage, seed genotype, seed temperature, as well as various other characteristics. Seed quality sensors 380 can be located at various locations on mobile planting machine 100, such as in seed metering system 114 or seed delivery system 116, or both, as well as at various other locations. Seed quality sensors can include one or more of various types of sensors, such as, but not limited to, one or more cameras (e.g., mono or stereo cameras, etc.), thermal sensors (e.g., thermal scanner or imager, etc.), infrared sensors (e.g., infrared scanner or imager, etc.), x-ray sensors (e.g., x-ray scanner or imager, etc.), near infrared (NIR) sensors (e.g., NIR scanner or imager, NIR spectrometers, etc.), reflective sensors, as well as various other types of sensors.

In some examples, one type of sensor may be used to detect multiple characteristics, including multiple types of seed quality (or seed vigor) characteristics. For example, a reflective sensor or camera could be used to detect seed presence, seed size, as well as seed orientation. For instance, the sensor signal generated by a reflective sensor could be used to determine the presence of a seed, the size of a seed (e.g., the pulse width of the signal can be used to determine seed size), as well as the orientation of the seed (e.g., the pulse width of the signal can be used to determine the orientation of the seed). In another example, a camera could be used to determine seed presence, seed size, seed orientation, seed shape, seed damage, seed genotype, as well as various other characteristics. It will be noted that seeds can be coated with different color coatings (or some with no coating) to distinguish between different genotypes, for example, a genetically modified seed provided by a seed provider may have a coating of a given color whereas refuge seeds may have a coating with a different color or may not have a coating. The color can be detected by a seed quality sensor 380, such as a camera, to detect seed genotype. NIR sensors can be used to detect various characteristics of the seeds, such as, but not limited to, seed moisture, seed nutrient content, and seed damage. For example, the amount of reflectance or absorption of NIR electromagnetic radiation by a seed can be used to detect, among other things, seed moisture, seed nutrient content, and seed damage. Similarly, x-ray sensors can be used to detect various characteristics of the seeds, such as seed damage. For example, the amount of reflectance or absorption of x-ray electromagnetic radiation by a seed can be used to detect, among other things, seed damage (e.g., may indicate the health or vigor of the seed tissue). Infrared or thermal sensors can be used to detect various characteristics of the seeds, such as seed temperature. These are merely some examples.

Geographic position sensors 304 illustratively sense or detect the geographic position or location of mobile planting machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. In some examples, the geographic position or location detected by geographic position sensors 304 can be processed to derive a geographic position or location of a given component of mobile machine 100, such as a particular row unit 106 or a particular component of a row unit 106. The dimensions of the mobile machine, such as the distance of certain components from the geographic position sensors 304, which can be stored in data store 302 or otherwise provided, can be used, in combination with detected geographic position or location, to derive the geographic position or location of the component.

Heading/speed sensors 325 detect a heading and speed at which mobile planting machine 100 is traversing the worksite during the operation. This can include sensors that sense the movement of ground engaging traction elements (such as wheels or tracks of towing machine 103) or can utilize signals received from other sources, such as geographic position sensor 304. Thus, while heading/speed sensors 325 as described herein are shown as separate from geographic position sensor 304, in some examples, machine heading/speed is derived from signals received from geographic positions sensors 304 and subsequent processing. In other examples, heading/speed sensors 325 are separate sensors and do not utilize signals received from other sources.

As previously discussed, other sensors 328 can include various other sensors, including but not limited to other sensors discussed in previous figures. Additionally, other sensors 328 can include various sensors that detect operating parameters of mobile planting machine 100 as well as various other characteristics. For example, but not by limitation, other sensors 328 can include one or more seed metering system speed sensors that detect a speed at which the seed metering system 114, or a component thereof (e.g., rotatable element 130) is operating. Such as sensor could detect the output (e.g., rotational output) of seed metering system motor 352. In another example, other sensors 328 can include one or more seed delivery system speed sensors that detect a speed at which the seed delivery system, or a component thereof (e.g., seed transport mechanism, such as the belt 150 in FIG. 5A or the flighted belt in FIG. 5B), is operating. Such as sensor could detect the output (e.g., rotational output) of seed delivery system motor 354. These are merely some examples.

Sensors 373 of other machines 370 can include sensors that detect a wide variety of characteristics including, but not limited to, crop characteristics such as crop emergence, crop yield, as well as various other crop characteristics, the geographic position or location of an other machine 370, the heading or speed, or both, of an other machine 370, operating parameters of an other machine 370, as well as various other characteristics.

FIG. 6 shows that an operator 360 may operate mobile planting machine 100. The operator 360 interacts with operator interface mechanisms 318. The operator 360 may be local to mobile planting machine 100 or may be remote from mobile planting machine 100. In some examples, mobile planting machine 100 may be autonomous or semi-autonomous and thus the operator may be control system 314 and a human operator may or may not be included in the operation. Even where mobile planting machine 100 is autonomous or semi-autonomous, a human operator may supervise and/or initiate operation the autonomous or semi-autonomous mobile planting machine 100. FIG. 6 also shows that an operator 360 may operate other mobile machines 370. Other mobile machines 370 could include, but are not limited to, mobile agricultural material application machines (e.g., sprayers, dry spreaders, water/irrigation machines, etc.), mobile agricultural harvesting machines, as well as other mobile planting machines. The operator interacts with operator interface mechanisms 371. The operator 360 may be local to the other mobile machine 370 or may be remote from the other mobile machine 370. In some examples, the other mobile machine 370 may be autonomous or semi-autonomous and thus the operator may be control system 372 and a human operator may or may not be included in the operation. Even where the other mobile machine 370 is autonomous or semi-autonomous, a human operator may supervise and/or initiate operation of the autonomous or semi-autonomous other mobile machine 370.

In some examples, operator interface mechanisms 318 or operator interface mechanisms 371, or both, may include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, operator(s) 360 may interact with operator interface mechanisms 318 or operator interface mechanism 371, or both, using touch gestures. These examples described above are provided as illustrative examples and are not intended to limit the scope of the present disclosure. Consequently, other types of operator interface mechanisms 318 or operator interface mechanisms 371, or both, may be used and are within the scope of the present disclosure. It will also be noted that operators 360 can interact with other items of agricultural system 300 through operator interface mechanisms 318 or 371, or both, such as over network 359.

FIG. 6 also shows one or more remote users 366 interacting with one or more of mobile machine 100, other mobile machines 370, and remote computing systems 367, through user interface mechanisms 364 over network 359. User interface mechanisms 364 can include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, a remote user 364 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 367 can be a wide variety of different types of systems, or combinations thereof. For example, remote computing systems 367 can be in a remote server environment. Further, remote computing systems 367 can be remote computing systems, such as mobile devices, a remote network, a farm manager system, a vendor system, or a wide variety of other remote systems. In one example, mobile machine 100 can be controlled remotely by remote computing systems 367 or by remote users 366, or both. In one example, other mobile machines 370 can be controlled remotely by remote computing systems 368 or remote users 366, or both. As illustrated, remote computing systems 367 include seed quality learning component 368 and can include various other items. Seed quality learning component 368 can obtain (e.g., receive or retrieve) georeferenced seed quality data (e.g., processed sensor data generated by sensors 308, a seed quality map generated by seed quality map generator 312, etc.) generated by mobile planting machine 100 as well as obtain georeferenced data (e.g., processed sensor data generated by sensors 373, etc.) generated by other mobile machines 370. Seed quality learning component 368 illustratively learns from the obtained data can generated outputs such as adjustments to a control algorithm used by a mobile machine in subsequent operations, adjustments to the seed quality determination algorithm (e.g., adjustment to seed quality model in seed quality threshold and model data 391) utilized by seed quality processing system 340, adjustments to the seed quality threshold values (e.g., in seed quality threshold and model data 391) utilized by control system 314, as well as various other outputs.

As an example, during a first operation the control algorithm may determine that seed quality below a given value (e.g., threshold value of seed quality threshold and model data 381) should result in a given control response, such as controlling seed removal subsystem 350 to remove the seed (or otherwise prevent the seed from being deposited in the furrow) and speeding up one or more of seeding metering system motor 352 and seed delivery system motor 354 to compensate for the removal of the seed. In a subsequent operation performed by an other machine 370 (such as a material application machine or a harvester) one or more sensors 371 may provide data indicative of characteristics of resulting crops (e.g., emergence, yield, etc.). In response to this crop characteristic data, seed quality learning component may adjust the control algorithm or the seed quality threshold value, for example, to adjust the threshold value higher or to cause the removal of seeds in a future operation with a higher quality score. For example, it may be that the previous threshold value or control algorithm retained seeds with a quality value of 80 or above, and the seed quality learning component 368 may learn, based on the subsequent crop characteristic data, that only seeds with a quality value of 82 or above should be retained. This is merely one example. In another example, seed quality learning component 368 may adjust the model used to determine seed quality values based on subsequent crop characteristic data of resultant crops. Thus, in a subsequent planting operation, the adjusted model may be used. This is merely one example.

As will be described below, in some examples, one or more of the components shown being disposed on mobile machine 100 in FIG. 6 can be located elsewhere, such as at remote computing systems 368 and/or user interface mechanisms 364.

As illustrated in FIG. 6, mobile planting machine 100 also includes a seed quality map generator 312. Seed quality map generator 312 generates a seed quality map of the worksite (e.g., field) at which mobile planting machine 100 operates that includes georeferenced seed quality values. Each seed quality value can indicate the quality of a seed planted at a given location in the worksite. Seed quality map generator 312 will be described in more detail in FIG. 7.

FIG. 6 also shows that mobile machine 100 includes a control system 314 and one or more controllable subsystems 316. Control system 314 illustratively generates control signals that control one or more other components of mobile machine 100 or agricultural system 300, or both. FIG. 6 also shows that other mobile machines 370 include a control system 372 and one or more controllable subsystem 374. Control system 372 illustratively generates control signals to control one or more other components of an other mobile machine 370 or agricultural system 300, or both.

Control system 314, as illustrated, includes communication system controller 329, interface controller 330, one or more seed removal controller(s) 331, one or more seed metering system controller(s) 333, one or more seed delivery system controllers 335, map generator controller 337, seed quality processing system 340, and can include various other items, including various other controllers to control various other items such as other controllable subsystems 359. Controllable subsystems 316, as illustrated, include seed removal subsystem 350, one or more seed metering system motors 352, one or more seed delivery system motors 354, material application system 356, and can include various other items 359 such as various other controllable subsystems.

Seed removal subsystem 350 can include a controllable (e.g., actuatable) device 351 (e.g., nozzle or valve, or both), on each row unit 106, through which compressed fluid (e.g., compressed air) travels to be applied to a seed to remove the seed from the seed stream (or to otherwise prevent the seed from being delivered to the furrow opened by the respective row unit 106). Seed removal subsystem 350 can include various other items 353 (some of which have been previously mentioned), including, but not limited to, one or more compressors or pumps, one or more compressed fluid storage devices, conduits/tubes/hoses/lines, as well as various other items. Seed metering system motors 352 are motors (e.g., hydraulic, electric, pneumatic, etc.) that are operable to variably drive (cause movement, such as rotation) of respective seed metering systems 114. Each row unit 106 may include a seed metering system motor 352 to controllably drive the respective metering system 114 at desired and variable speeds. Seed delivery system motors 354 are motors (e.g., hydraulic, electric, pneumatic, etc.) that are operable to variably drive (cause movement, such as rotation) of respective seed delivery systems 116. Each row unit 106 may include a seed delivery system motor 352 to controllable drive the respective seed delivery system 116 at desired and variable speeds. Material application system 356 can include one or more controllable (e.g., actuatable) devices 357 (e.g., valves or nozzles, or both, etc., such as devices 109) on each row unit 106 which can be controlled to control the application of material (e.g., fertilizer, pesticide, insecticide, herbicide, etc.). Material application system 356 can include various other items 358, such as one or more fluid lines (e.g., 111) on each row unit, conveyance mechanism(s) (e.g., pumps, metering devices, etc.), as well as various other items.

Communication system controller 329 controls communication system 306 to communicate data (e.g., sensor data generated by sensors 308, a seed quality map generated by seed quality map generator 312, outputs of control system 314, etc.) to other items of agricultural system 300, such as one or more of remote user interface mechanisms 364, remote computing systems 367, and other mobile machine 370 over network 359. Similarly control system 372 can include a communication system controller that controls communication system 376 to communicate data (e.g., sensor data generated by sensors 373, outputs of control system 372, etc.) to other items of agricultural system 300, such as one or more of remote user interface mechanisms 364, remote computing systems 367, and mobile machine 100 over network 359.

It will be noted that network 359 can be one or more networks, such as, but not limited to, one or more of a wide area network a local area network, a near field communication network, a controller area network, as well as wide variety of other networks. Thus, communication system 306 and 376 can be configured to communicate over any such network or combination of networks.

Interface controller 330 is operable to generate control signals to control interface mechanisms, such as operator interface mechanisms 318 or user interface mechanisms 364, or both. The interface controller 330 is operable to cause an interface mechanism to present (e.g., display) data (e.g., sensor data generated by sensors 308, a seed quality map generated by seed quality map generator 312, outputs of control system 314, alerts, notifications, etc.) to an operator 360 or a remote user 366, or both. Similarly, control system 372 can include an interface controller that is operable to generate control signals to control interface mechanism, such as operator interface mechanisms 371 or user interface mechanisms 364, or both. The interface controller of control system 372 is operable to cause an interface mechanism to present (e.g., display) data (e.g., sensor data generated by sensors 373, a seed quality map generated by seed quality map generator 312, outputs of control system 314, alerts, notifications, etc.) to an operator 360 or remote user 364, or both.

Seed quality processing system 340 illustratively generates seed quality characteristic values and seed quality values. Seed quality processing system 340 illustratively obtains (e.g., receives or retrieves) sensor data generated by sensors 308 (e.g., seed quality sensors 380) and obtains seed quality threshold and model data 391 and based thereon determines quality of seeds of mobile planting machine 100 and generates, as an output, a seed quality value indicative of the determined seed quality. The seed quality value can be various types of values, such as a numerical and scaled value (e.g., a value out of 100 or out of 10), a textual and scaled value (e.g., A-F, high/medium/low, etc.) as well as various other types of values. Additionally, seed quality processing system 340 can generate the seed quality values as georeferenced seed quality values, particularly for seeds that are planted by mobile planting machine 100, based further on geographic location or position data generated by geographic position sensors 304, heading and speed data generated by heading/speed sensors 325, seed delivery system and/or seed metering system speed indicated by other sensors 328, as well machine dimensionality and configuration data (which may be part of other data 392) which can indicate, among other things, the location of the seed quality sensors 380 relative to the geographic position sensors 304 as well as the dimensions of components of the mobile planting machine 100, such as the dimensions of seed metering system 114 and the dimensions of seed delivery system 116. Thus, it will be understood that seed quality processing system 340 can generate, as an output, seed quality values, each indicative of a quality of an individual seed, as well as georeferenced seed quality values indicative of a geographic location at the worksite to which the seed quality values correspond, for instance, the georeferenced seed quality value output by seed processing system 340 can indicate the geographic location at the worksite at which a seed, having a given seed quality value determined by seed processing system 340, was deposited by mobile planting machine 100.

Additionally, seed quality processing system 340 can generate, as an output, seed quality characteristic values based on the obtained sensor data generated by sensors 308 (e.g., seed quality sensors 380) and based on the obtained seed quality threshold and model data 391. For example, it may be useful to know values of individual seed quality characteristics in addition to, or alternatively to, values of seed quality. Thus, seed quality processing system 340 can generate, as an output, one or more of seed shape values, seed size values, seed orientation values, seed moisture values, seed nutrient content values, seed damage values, seed genotype values, seed temperature values, as well as various other seed quality characteristic values. The seed quality characteristic values can be various types of values, such as a numerical and scaled value (e.g., a value out of 100 or out of 10), a textual and scaled value (e.g., A-F, high/ medium/low, etc.) as well as various other types of values. Further, seed quality processing system 340 can generate the seed quality characteristic values as georeferenced seed quality characteristic values, particularly for seeds that are planted by mobile planting machine 100, based further on geographic location or position data generated by geographic position sensors 304, heading and speed data generated by heading/speed sensors 325, seed delivery system and/or seed metering system speed indicated by other sensors 328, as well machine dimensionality and configuration data (which may be part of other data 392) which can indicate, among other things, the location of the seed quality sensors 380 relative to the geographic position sensors 304 as well as the dimensions of components of the mobile planting machine 100, such as the dimensions of seed metering system 114 and the dimensions of seed delivery system 116. Thus, it will be understood that seed quality processing system 340 can generate, as an output, seed quality characteristic values, each indicative of a value of a different one of a plurality of seed quality characteristics of an individual seed, as well as georeferenced seed quality characteristic values indicative of a geographic location at the worksite to which the seed quality characteristic values correspond, for instance, the georeferenced seed quality characteristic values output by seed processing system 340 can indicate the geographic location at the worksite at which a seed, having the given seed quality characteristic values determined by seed processing system 340, was deposited by mobile planting machine 100.

It will be understood that seed quality processing system 340 can utilize various sensor data processing functionalities, such as sensor data filtering functionalities, sensor data noise filtering functionalities, sensor data categorization functionalities, sensor data aggregation functionalities, sensor data normalization functionalities, as well as various other processing functionalities. Further, seed quality processing system 340 can utilize various image processing functionalities such as, but not limited to, sequential image comparison, RGB or CKNY color extraction, edge detection, black/white analysis, pixel analysis, pixel testing, pixel clustering, shape detection, as well as various other image processing functionalities. Further, seed quality processing system 340 can utilize machine learning or non-machine learning functionalities, or both.

As illustrated, control system 314 can include one or more seed removal controllers 331 that control the seed removal subsystem 350. For example, each device 351 may have a respective seed removal controller 331 or multiple devices 351 may be controlled by a single seed removal controller 331. Based on seed quality values or seed quality characteristic values, or both, output by seed quality processing system 340, as well as, in some examples, a seed quality threshold value or seed quality characteristic threshold value(s), or both, of data 391, seed removal controllers 331 can generate control signals to control seed removal subsystem 350 (e.g., control one or more devices 351 to actuate, such as to direct compressed fluid at a seed or otherwise cause contact with a seed) to remove seeds from a seed stream or to otherwise prevent seeds from being deposited in furrows generated by planting implement 101. The quality or quality characteristics, or both, of individual seeds of each row unit 106 can be determined by seed quality processing system 340 and based thereon, the device 351 corresponding to each row unit can be individually controlled by a seed removal controller 331 to remove an individual seed from the seed stream of the row unit 106 or to otherwise prevent the individual seed from being deposited in the furrow opened by the row unit 106.

As illustrated, control system 314 can include one or more seed metering system controllers 333 that control the one or more seed metering system motors 352. For example, each motor 352 may have a respective seed metering system controller 333 or multiple motors 352 may be controlled by a single seed metering system controller 333. Where seed removal subsystem 350 is controlled to remove a seed, a seed metering system controller 333 may generate a control signal to control a seed metering system motor 352 to adjust the speed of a seed metering system 114 to compensate for the removed seed such that the seed spacing, as planted, can be maintained (at least approximately) as desired, preferably without slowing the travel speed of the mobile planting machine 100. That is a seed that was behind the removed seed can be sped up to take the place of (or at least approximately take the place of) the removed seed.

As illustrated, control system 314 can include one or more material application system controllers 334 that control the material application system 356. For example, each device 357 may have a respective material application system controller 334 or multiple devices 357 may be controlled by a single material application system controller 334. Based on seed quality values or seed quality characteristic values, or both, output by seed quality processing system 340, as well as, in some examples, a seed quality threshold value or seed quality characteristic threshold value(s), or both, of data 391, material application system controllers 357 can generate control signals to control material application system 356 (e.g., control one or more of devices 357 to actuate) to apply material to the field.

As illustrated, control system 314 can include one or more seed delivery system controllers 335 that control the one or more seed delivery system motors 354. For example, each motor 354 may have a respective seed delivery system controller 335 or multiple motors 354 may be controlled by a single seed metering system controller 335. Where seed removal subsystem 350 is controlled to remove a seed, a seed delivery system controller 335 may generate a control signal to control a seed delivery system motor 354 to adjust the speed of a seed delivery system 116 to compensate for the removed seed such that the seed spacing, as planted, can be maintained as desired, preferably without slowing the travel speed of the mobile planting machine 100. That is a seed that was behind the removed seed can be sped up to take the place of (or at least approximately take the place of) the removed seed.

Map generator controller 337 is operable to control seed quality map generator 312 to track seed quality values and to generate a seed quality map indicative of the seed quality values. For example, map generator controller 337 can be used to activate or deactivate seed quality map generator 312.

It will be noted that in some examples, the speed of a seed metering system motor 352 and the speed of a seed delivery system motor 354 can be adjusted to compensate for the removal of a seed by seed removal subsystem 350 such that the seed spacing, as planted, can be maintained as desired, preferably without slowing the travel speed of mobile planting machine 100. That is a seed that was behind the removed seed can be sped up (e.g., by temporarily increase the speed of the seed metering system motor 352 or the speed of the seed delivery system motor 354, or both) to take the place of (or at least approximately take the place of) the removed seed.

It will be noted that mobile planting machine 100 can include various other controllable subsystems 359 that can be controlled by various other controllers 341.

It will be noted that control system 372 can include one or more controllers that generate control signals to control one or more controllable subsystems 374. For example, where the other mobile machine 370 is a mobile agricultural material application machine (e.g., a sprayer, a dry spreader, water/irrigation machine, etc.), controllers of control system 372 may control controllable subsystems 374 to control the application of material applied by the other mobile agricultural material application machine, such as controlling whether or not material is applied at a given location or the amount (e.g., rate) of material applied at a given location based on a seed quality map generated by seed quality map generator 312. For instance, the seed quality map may indicate the genotype of seeds at different locations across the field, and insecticide may be controllably applied to areas of the field with refuge seed and not applied (or applied at a lower rate) to areas of the field with non-refuge seeds (e.g., a hybrid that is more resilient to insects). This is merely one example. In another example, where the other mobile machine 370 is a mobile agricultural harvesting machine (e.g., a combine harvester, etc.), controllers of control system 372 may control controllable subsystems 374 to control various parameters of the mobile agricultural harvesting machine, such as, but not limited to, travel speed, route, as well as the speed and/or position of various components of the agricultural harvesting machine, etc., based on a seed quality map generated by seed quality map generator 312.

While the illustrated example of FIG. 6 shows that various components of agricultural system architecture 300 are located on mobile machine 100, it will be understood that in other examples one or more of the components illustrated on mobile machine 100 in FIG. 6 can be located at other locations, such as one or more remote computing systems 367. For instance, one or more of data stores 302, seed quality processing system 340, and seed quality map generator 312 can be located remotely from mobile machine 100 but can communicate with mobile machine 100 via communication system 306 and network 359. Thus, the one or more of the seed quality map, seed quality values, and seed quality characteristic values may be generated at remote locations away from mobile machine 100 and can be communicated to or otherwise accessed by mobile machine 100 (or other items of agricultural system 300) over network 359. The information used in the generation of the seed quality map, the seed quality values, and the seed quality characteristic values may be communicated or otherwise accessed over network 359, for example sensor data generated sensors 308 can be provided over network 359 to the remote locations. Similarly, data in a data store 302 located remotely from mobile machine 100, can be communicated to mobile machine 100 via communication system 306 and network 359. These are merely examples.

In some examples, control system 314, or components thereof (such as map generator controller 337 or seed quality processing system 340, or both) can be located remotely from mobile machine 100 such as at remote computing systems 367. In other examples, a remote location, such as remote computing systems 367, may include a respective control system which generates control values that can be communicated to mobile machine 100 and can be used by on-board control system 314 to control the operation of mobile machine 100. These are merely examples.

Figure 7:
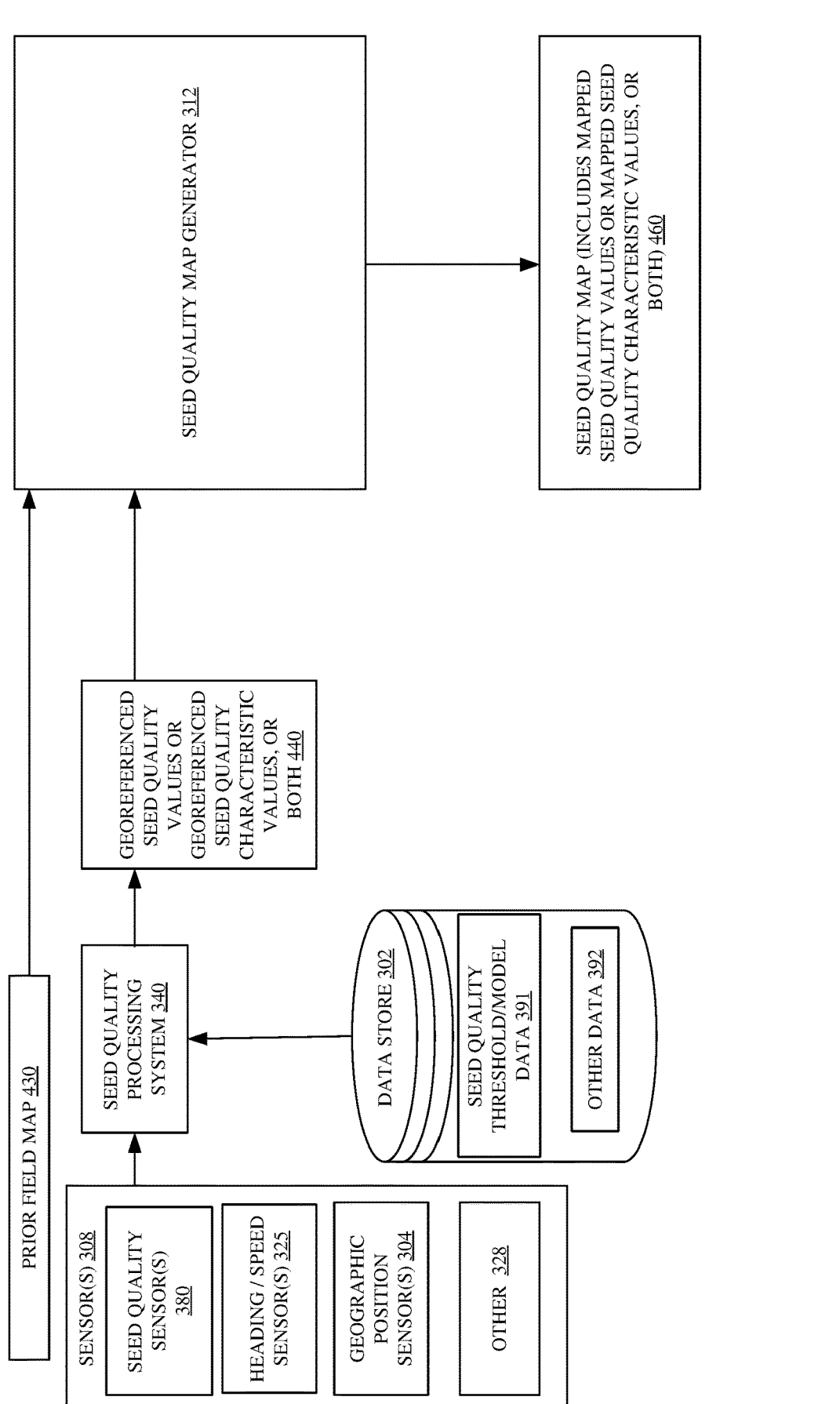
FIG. 7 is a block diagram showing one example of a seed quality map generator.

FIG. 7 is a block diagram of a portion of the agricultural system architecture 300 shown in FIG. 6. Particularly, FIG. 7 shows, among other things, examples of the seed quality map generator 312 in more detail. FIG. 7 also illustrates information flow among the various components shown. As illustrated in FIG. 7, seed quality processing system 340 obtains (e.g., receives or retrieves) sensor data from sensors 308 as well as data from data store 302 and based thereon generates georeferenced seed quality values and/or georeferenced seed quality characteristic values 440. Seed quality map generator 312 obtains the georeferenced seed quality values and/or georeferenced seed quality characteristic values 440 and, in some examples, a prior field map 430. Prior field map 430 may indicate the location and boundaries of the worksite (e.g., field) at which mobile planting machine 100 is currently operating. In this way, seed quality map generator 312 can populate prior field map 430 with georeferenced seed quality values and/or georeferenced seed quality characteristic values 440 at their geographic locations in the prior field map 430 to generate seed quality map 460. In other examples, a prior field map 430 need not be used. Additionally, while prior field map 430 is shown separately from data store 302, it will be understood that prior field map 430 can be stored in data store 302 (e.g., as part of other data 392) and obtained therefrom.

Seed map generator 312 thus generates, based on georeferenced seed quality values and/or georeferenced seed quality characteristic values 440 and, in some examples, prior field map 430, a seed quality map 460. Seed quality map 460 illustratively maps seed quality values or seed quality characteristic values, or both, to their corresponding locations in the worksite (e.g., field) at which mobile planting machine 100 is operating (or at which the mobile planting machine 100 did operate). Thus, seed quality map 460, can include seed quality values or seed quality characteristic values, or both, for each of a plurality of seeds planted by mobile planting machine 100 at the locations at which the plurality of seeds were planted by mobile planting machine 100. The seed quality map 460 can be generated during the operation of mobile planting machine 100 at the worksite or after the operation, or both. Additionally, particularly when generated during the operation, it will be understood that the seed quality map 460 can be continuously updated based on additional data obtained by seed quality map generator 312.

The seed quality map 460 may be provided to control system 314. Control system 314 may control controllable subsystems 316 based on the seed quality map and/or may control an interface mechanism (e.g., 318 or 364, or both) to present (e.g., display) the seed quality map 460. In some examples, control system 314 may control communication system 306 to provide the seed quality map 460 to another system, such as remote computing systems 367 or other mobile machines 370, or both. An other mobile machine 370 can utilize seed quality map 460 during its operation, for instance, control system 372 can generate control signals to control controllable subsystems 374 based on seed quality map 460 and/or may control an interface mechanism (e.g., 371 or 364, or both) to present (e.g., display) the seed quality map 460. In some examples, other mobile machine machines 370 may obtain seed quality map 460 from another source, such as remote computing systems 367.

FIG. 8 shows a flow diagram illustrating one example of the operation of agricultural system architecture 300 in detecting seed quality and/or seed quality characteristic values and controlling operation of a mobile machine, such as mobile planting machine 100.

First, it is assumed that mobile planting machine 100 has begun operating at a worksite (e.g., field).

At block 502, sensors 308 generate sensor data indicative of sensed characteristic values. For example, seed quality sensors 380 can generate sensor data indicative of seed quality values or seed quality characteristic values, or both, as indicated by block 504. Various other sensors 308 can generate sensor data indicative of various other sensed characteristic values, as indicated by block 506. For example, at block 506, geographic position sensors 304 can generate sensor data indicative of geographic positions or locations of mobile planting machine 100, heading/speed sensors 325 can generate sensor data indicative of headings or speeds, or both, of mobile planting machine 100, other sensors 328 can generate sensor data indicative of various other characteristic values, such as metering system 114 operating speeds or seed delivery system 116 operating speeds, or both.

At block 508, data store 302 stores or has stored various data. For example, data store 302 may store or have stored seed quality and threshold data 391, as indicated by block 510. Data store 302 may also store or have stored various other data 392, as indicated by block 512.

At block 514, seed quality processing system 340 obtains (e.g., retrieves or receives) the sensor data generated by sensors 308 and data from data store 302 and based thereon generates values. As indicated by block 516, seed quality processing system 340 can generate seed quality values, each indicative of a quality of an individual seed, or seed quality characteristic values, or both. For each individual seed, seed quality processing system 340 may generate one or more seed quality characteristic values, such as one or more of a seed shape value, a seed size value, a seed orientation value, a seed moisture value, a seed nutrient content value, a seed damage value, a seed genotype value, a seed temperature value, as well as various other seed characteristic values.

Optionally, at block 518, control system 314 may compare the generate seed quality values or seed quality characteristic values, or both, to respective threshold values. The threshold values can be within seed quality and threshold data 391. For instance, there may be seed quality threshold values, as well as seed quality characteristic threshold values.

At block 520, control system 314 generates and applies one or more control signals based on the generated seed quality values or the generated seed quality characteristic values, or both, and, in some examples, based on the comparison to the respective threshold values.

As indicated by block 522, control system 314 can generate and apply control signals to one or more controllable subsystems 316. For instance, at block 522, seed removal controller(s) 331 may generate and apply control signal(s) to seed removal subsystem(s) 350 to control the seed removal subsystem(s) 350 to remove seed(s) or to otherwise prevent seed(s) from being deposited in furrow(s). Additionally, at block 522, seed metering system controller(s) 333 may generate and apply control signals to seed metering system motor(s) 352 to adjust the speed of the seed metering system motor(s) 352 to compensate for the removal of the seed(s). Additionally, at block 522, seed delivery system controller(s) 335 may generate and apply control signals to seed delivery system motor(s) 354 to adjust the speed of the seed delivery system motor(s) 354 to compensate for the removal of the seeds. Additionally, at block 522, material application system controller(s) 334 may generate and apply control signals to material application system 356 to control the application of material (e.g., fertilizer, pesticide, insecticide, herbicide, etc.). These are merely some examples. Control system 314, at block 522, can generate and apply control signals to control various other controllable subsystems 359.

Additionally, or alternatively, as indicated by block 524, control system 314 (e.g., interface controller 330) can generate and apply control signals to one or more interface mechanisms (e.g., 318 or 364, or both) to control the one or more interface mechanisms to generate presentations, such as one or more of display the generated seed quality values or the generated seed quality characteristic values, or both, surfacing alerts or other notifications, as well as various other presentations.

These are merely some examples. Control system 314 can generate and apply various other control signals to control various other items of agricultural system 300, as indicated by block 526.

At block 528, it is determined if the operation has been completed (e.g., mobile planting machine 100 has finished at the worksite or control based on seed quality/seed quality characteristics has been deactivated). If the operation has not been completed, processing returns to block 502. If the operation has been completed, then processing ends.

Figure 9A:
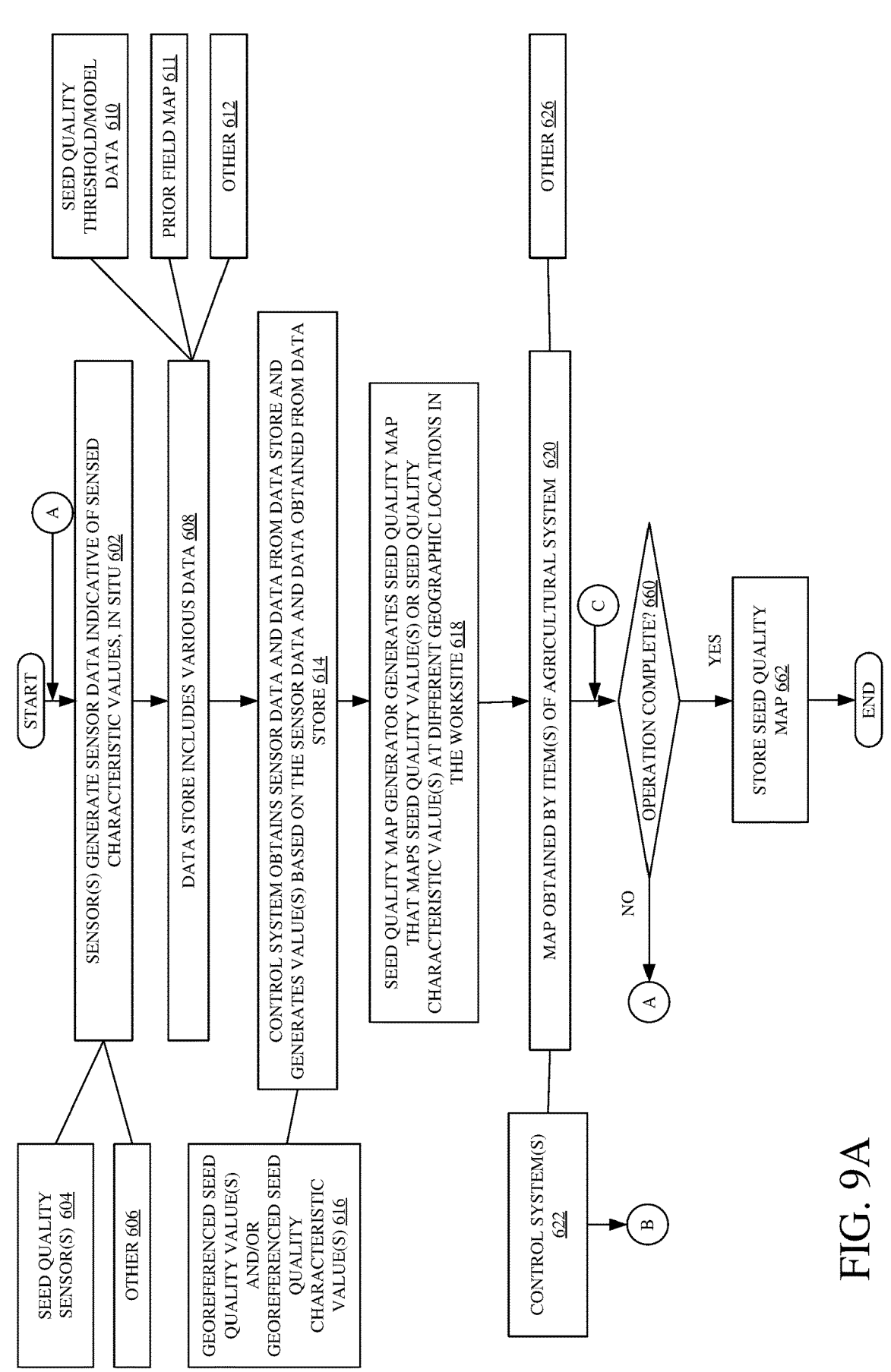
FIGS. 9A-9B (collectively referred to herein as FIG. 9) show a flow diagram illustrating one example of operation of an agricultural system in generating a seed quality map.
Figure 9B:
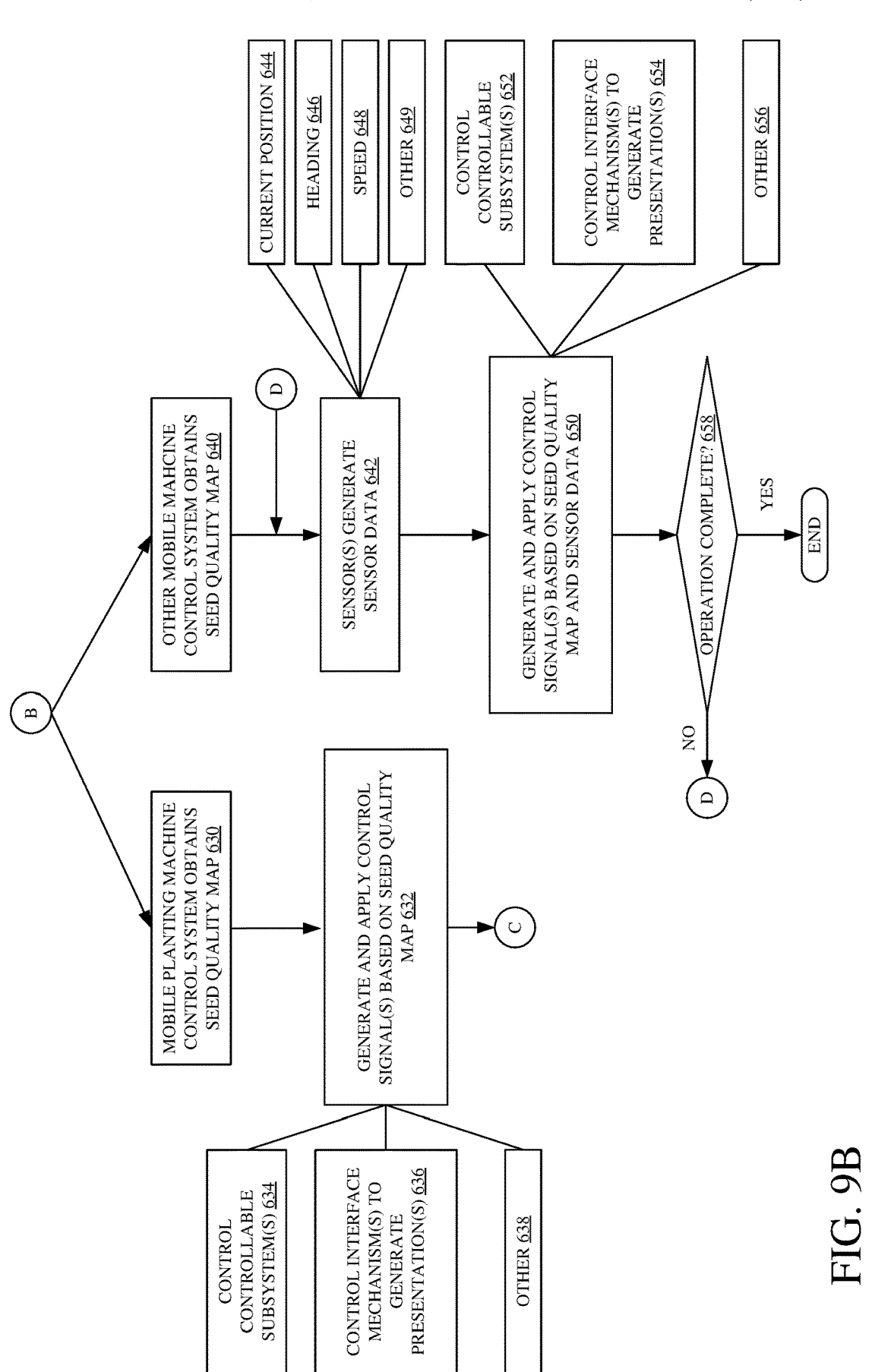

FIGS. 9A-B (collectively referred to herein as FIG. 9) show a flow diagram illustrating one example of the operation of agricultural system architecture 300 in generating a seed quality map.

First it is assumed that mobile planting machine 100 has begun operating at a worksite (e.g., field).

At block 602, sensors 308 generate sensor data indicative of sensed characteristic values. For example, seed quality sensors 380 can generate sensor data indicative of seed quality values or seed quality characteristic values, or both, as indicated by block 604. Various other sensors 308 can generate sensor data indicative of various other sensed characteristic values, as indicated by block 606. For example, at block 606, geographic position sensors 304 can generate sensor data indicative of geographic positions or locations of mobile planting machine 100, heading/speed sensors 325 can generate sensor data indicative of headings or speeds, or both, of mobile planting machine 100, other sensors 328 can generate sensor data indicative of various other characteristic values, such as metering system 114 operating speeds or seed delivery system 116 operating speeds, or both.

At block 608, data store 302 stores or has stored various data. For example, data store 302 may store or have stored seed quality and threshold data 391, as indicated by block 610. Data store 302 may also store or have stored a prior field map 430, as indicated by block 611. Data store 302 may also store or have stored various other data 392, as indicated by block 612.

At block 614, seed quality processing system 340 obtains (e.g., retrieves or receives) the sensor data generated by sensors 308 and data from data store 302 and based thereon generates georeferenced values. As indicated by block 616, seed quality processing system can generate georeferenced seed quality values, each indicative of a georeferenced quality of an individual seed, or georeferenced seed quality characteristic values, or both. For each individual seed, seed quality processing system 340 may generate one or more georeferenced seed quality characteristic values, such as one or more of a georeferenced seed shape value, a georeferenced seed size value, a georeferenced seed orientation value, a georeferenced seed moisture value, a georeferenced seed nutrient content value, a georeferenced seed damage value, a georeferenced seed genotype value, a georeferenced seed temperature value, as well as various other georeferenced seed characteristic values.

At block 618, seed quality map generator 312 generates a seed quality map 460 that maps the georeferenced seed quality values or the georeferenced seed quality characteristic values, or both, to the geographic locations in the worksite to which they correspond. Seed quality map generator 312 may utilize a prior field map 430 to generate the seed quality map 460, such as by populating the prior field map 430 with the georeferenced seed quality values or the georeferenced seed quality characteristic values, or both, at their corresponding geographic locations. Seed quality map generator 312 may generate the seed quality map 460 in other ways as well, including without the use of a prior field map 430.

At block 620, the seed quality map 460 is obtained by one or more items of agricultural system 300. For example, at block 622, the seed quality map 460 can be obtained by control system 314 of mobile planting machine 100 or can be obtained by control system(s) 372 of other mobile machine(s) 370. In some examples, the seed quality map 460 is obtained by control system(s) 372 of other mobile machine(s) 370 after mobile planting machine 100 has completed operation at the worksite. These are merely some examples. As indicated by block 626, various other items of agricultural system 300 can obtain seed quality map.

At block 660 it is determined it is determined if the operation has been completed (e.g., mobile planting machine 100 has finished at the worksite or seed quality/ seed quality characteristic detection has been deactivated). If the operation has not been completed, processing returns to block 602. If the operation has been completed, then the seed quality map 460 is provided to and stored on one or more data stores such as one or more of data store 302, data store 381, and a data store of remote computing systems 367 (which can be one of other items 369). Once the seed quality map 460 has been stored, processing ends.

Discussion will now return to block 622. In some examples, seed quality map 460 is obtained by control system 314 of mobile planting machine 100 as indicated by block 630. At block 632, control system 314 can generate and apply control signal(s) based on the seed quality map 460. For instance, control system 314 may generate control signals to control one or more controllable subsystems 316, as indicated by block 634. Additionally, or alternatively, as indicated by block 636, control system 314 (e.g., interface controller 330) may generate control signals to control one or more interface mechanisms (e.g., 318 or 364, or both) to control the one or more interface mechanism to generate presentations, such as to display the seed quality map 460, or to display information based on or derived from the seed quality map 460.

These are merely some examples. Control system 314 can generate an apply various other control signals to control various other items of agricultural system 300, as indicated by block 638.

In some examples, seed quality map 460 is obtained by a control system 372 of an other mobile agricultural machine 370, as indicated at block 640. At block 642, sensors 373 generate sensor data. For example, sensors 373 can generate: sensor data indicative of a current geographic position or location of mobile machine 370, as indicated by block 644; sensor data indicative of a current heading of mobile machine 370, as indicated by block 646; sensor data indicative of a current speed of mobile machine 370, as indicated by block 648; and sensor data indicative of various other characteristics, as indicated by block 649.

At block 650, control system 372 can generate and apply control signals based on the seed quality map 460 and, at least in some examples, based on the sensor data obtained from sensors 373. For example, control system 372 can generate and apply control signals to one or more controllable subsystems 374, as indicated by block 652. Additionally, or alternatively, control system 372 can generate and apply control signals to one or more interface mechanisms (e.g., 371 or 364, or both) to control the one or more interface mechanism to generate presentations, such as to display the seed quality map 460, or to display information based on or derived from the seed quality map 460.

These are merely some examples. Control system 372 can generate and apply various other control signals to control various other items of agricultural system 300, as indicated by block 656.

At block 658, it is determined if the operation has been completed (e.g., mobile machine 370 has finished at the worksite or control of mobile machine 370 based on the seed quality map 4460 has been deactivated). If the operation has not been completed, processing returns to block 642. If the operation has been completed, then processing ends.

FIG. 10 shows a flow diagram illustrating one example of the operation of agricultural system architecture 300 in performing seed quality learning.

At block 702, sensor(s) 373 of other mobile agricultural machine(s) 370 generate sensor data. As indicated by block 704, sensor(s) 373 of other mobile agricultural machine(s) 370 may generate sensor data indicative of one or more crop characteristic(s), such as one or more of yield, crop emergence, crop size, crop health, as well as various other crop characteristics. As indicated by block 706, sensor(s) 373 of other mobile agricultural machine(s) can generate sensor data indicative of various other characteristics.

At block 708, a data store (e.g., a data store of remote computing systems 367, which can be one of other items 369) stores or has stored one or more data items. As indicated by block 710, the data store can store or have stored seed quality and threshold data 391. As indicated by block 711, the data store can store or have stored a seed quality map 460. The data store can store or have stored various other data 392, as indicated by block 712.

At block 714, seed quality learning component 368 obtains the sensor data generated by sensor(s) 373 and the data in the data store, at block 708, and based thereon generates one or more seed quality learning outputs.

As indicated by block 716, seed quality learning component 368 can generate, as a seed quality learning output, an adjustment to a seed quality value determination algorithm (utilized by seed quality processing system 340 to generate seed quality values) or an adjustment to a seed quality characteristic value determination algorithm (utilized by seed quality processing system 340 to generate seed quality characteristic values), or both. This may include updating the algorithm(s) (e.g., models, functions, etc.) stored in seed quality threshold and model data 392. For example, based on the crop characteristic data resulting from planted seeds, seed quality learning component 368 may determine that seed quality values or seed quality characteristic values, or both, should be adjusted such that in subsequent operations seeds with the same characteristics as the seeds in the previous operation will have adjusted values.

Alternatively, or additionally, as indicated by block 718, seed quality learning component 368 can generate, as a seed quality learning output, an adjustment to a seed quality value threshold or a seed quality characteristic value threshold, or both. For example, based on the crop characteristic data resulting from planted seeds, seed quality learning component 368 may determine that seed quality value thresholds or seed quality characteristic value thresholds, or both, utilized in control, should be adjusted such that subsequent machine control is also adjusted.

Alternatively, or additionally, as indicated by block 720, seed quality learning component 368 can generate, as a seed quality learning output, an adjustment to control algorithms of one or more machines (e.g., one or more of mobile planting machine 100 and other machine(s) 370). For example, based on the crop characteristic data resulting from planted seeds, seed quality learning component 368 may determine that different control measures should be taken for given seed quality values or for given seed quality characteristic values, or both. For instance, in a previous planting operation, a previous control algorithm may have provided an adjustment to seed metering system speed or seed delivery system speed, or both, that, based on the crop characteristic data, has proven undesirable (e.g., resulted in undesirable seed spacing). Thus, seed quality learning component 368 will generate an adjusted control algorithm for use in controlling seed metering system speed or seed delivery system speed, or both, in subsequent operations. In another example, in a previous material application operation, a previous control algorithm may have provided an application rate of material that, based on the crop characteristic data, has proven undesirable (e.g., resulted in poorer than expected yields). Thus, seed quality learning component 368 will generate an adjusted control algorithm for us in controlling material application in subsequent operations These are merely some examples.

At block 724, the one or more seed quality learning outputs are obtained and utilized by one or more items of agricultural system 300. For example, the seed quality learning output(s) can be obtained and utilized by one or more control systems, such as one or more of control system 314 and control system 372. Control system 314 may utilize the seed quality learning output(s) in the subsequent generation of seed quality values or seed quality characteristic values, or both, as well as in the control of one or more items of agricultural system 300. Control system 372 may utilize the seed quality learning output(s) in the subsequent control of one or more items of agricultural system 300. These are merely some examples. Various other items of agricultural system 300 may obtain and utilize the seed quality learning output(s), as indicated by block 728.

At block 730 it is determined if the operation of seed quality learning component 368 has been completed. If not, then processing returns to block 702. If the operation of seed quality learning component 368 has been completed, then the seed quality learning output(s) are stored in one or more data stores, such as one or more of data store 302, data store 381, and a data store of remote computing systems 367 (which may be one of other items 369). Once the seed quality learning output(s) have been stored, processing ends.

Figure 11:
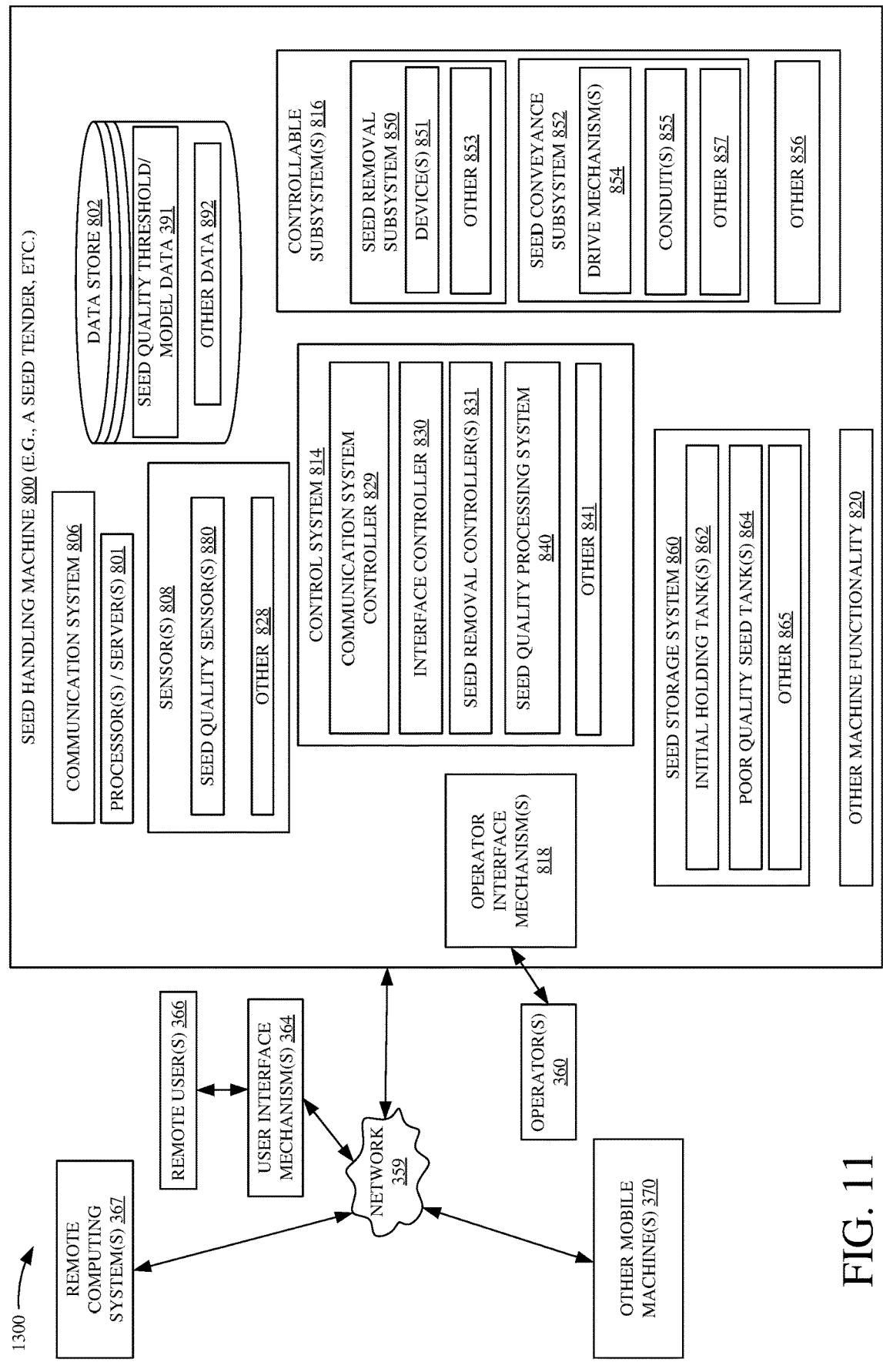
FIG. 11 is a block diagram showing one example of an agricultural system, including a seed handling machine, in more detail, according to some examples of the present disclosure.

FIG. 11 is a block diagram showing one example of an agricultural system architecture 1300. Agricultural system architecture 1300 is similar to agricultural system architecture 300 and thus, similar items are numbered similarly. Agricultural system architecture 1300 differs from agricultural system architecture 300 in that it further includes a seed handling machine 800. In one example, seed handling machine 800 is a seed tender, such as a mobile seed tender, however other types of seed handling machines are contemplated herein.

Seed handling machine 800, itself, includes one or more processors or servers 801, data store 802, communication system 806, one or more sensors 808, control system 814, one or more controllable subsystems 816, one or more operator interface mechanisms 818, seed storage system 860, and can include various other machine functionality 820.

Data store 302 can be similar to data store 302 or data store 381, or the data store of remote computing systems 367, and, as shown, similarly includes seed quality threshold and model data 391 and can include various other data 892, which can be similar to other data 392, but may also include information such as computer executable instructions that can be executed by one or more processors or servers, such as one or more processors or servers 801, to implement one or more other components of seed handling machine 800 or implement the functionality of one or more other components of seed handling machine 800. Communication system 806 can also be similar to communication system 306 or communication system 376, or both. Operator interface mechanisms 818 can be similar to operator interface mechanisms 318 or operator interface mechanisms 371, or both.

Sensors 808 include seed quality sensors 880. Seed quality sensors 880 can be similar to seed quality sensors 308 and can generate similar sensor data as seed quality sensors 308. Seed quality sensors 880 can generate sensor data indicative of a quality of seeds in seed handling machine 800, including sensor data indicative of seed quality characteristics such as seed shape, seed size, seed orientation, seed moisture, seed nutrient content, seed damage, seed genotype, seed temperature, as well as various other seed quality characteristics. Seed quality sensors 880 are configured to detect seeds within seed handling machine 800, such as within seed storage system 860 or seed conveyance system 850, or both. Sensors 808 can also include various other sensors 828 which can sense and generate sensor data indicative of various other characteristics.

FIG. 11 illustrates that seed handling machine 800 includes a control system 814 and one or more controllable subsystems 816. Control system 814 illustratively generates control signals that control one or more other components of seed handling machine 800 or agricultural system 1300, or both. Control system 814, itself, includes communication system controller 829, interface controller 830, seed removal controller(s) 831, seed quality processing system 840, and can include various other items, including various other controllers to control various other items such as other controllable subsystems 856. Controllable subsystems 816, as illustrated, include seed removal subsystem 850, seed conveyance subsystem, and can include various other items 856 such as various other controllable subsystems.

Seed removal subsystem 850 can include one or more controllable devices 851 that are actuatable to engage a seed or to direct a compressed fluid (e.g., compressed air) to engage a seed to prevent the seed being delivered to another machine (e.g., to planting machine 100, or to a component of planting machine 100, such as a hopper 112 or other seed storage component). In one example, device(s) 851 comprises nozzle(s) or valve(s) or both which are controllably actuatable to release a compressed fluid to prevent the seed from being delivered to another machine. For example, such a device 851 may be positioned at an outlet of seed conveyance mechanism 852. In another example, such a device 851 may be positioned within or otherwise have access to the interior of seed conveyance subsystem 852 to remove the seed from the seed stream being delivered to the other machine and possibly direct the seed to a poor quality seed tank 864. In another example, device 851 may be controllably actuatable member that is configured to, upon actuation, physically contact a seed to remove the seed from the seed stream being delivered to the other machine and possibly direct the seed to a poor quality seed tank 864. Such as device 851 could be placed at an outlet of seed conveyance subsystem 852 or could be positioned within or otherwise have access to the interior of seed conveyance subsystem. Other items 853 may vary depending on the type of device 851. For instance, where the device 851 is configured to actuate to direct compressed fluid, other items may include one or more compressors or pumps, one or more compressed fluid storage devices, conduits/tubes/hoses/lines, as well as various other items. In another example, where the device 851 includes an actuatable member that is configured to, upon actuation, physically contact a seed, other items 853 may include one or more controllable actuators (e.g., electric actuators, hydraulic actuators, pneumatic actuators, etc.) configured to controllably actuate the member.

Seed conveyance subsystem 852, itself, includes one or more drive mechanisms 854 which may include, for example, one or more actuators (e.g., hydraulic actuators, pneumatic actuators, electric actuators, etc.) as well as a conveyance member (e.g., an auger) which is driven by the one or more actuators. Drive mechanisms 854 cause conveyance of seed from one or more initial holding tanks 862 along one or more conduits 855 (chutes, tubes, lines, hoses, etc.) in a seed stream to be delivered to another machine. Each conduit may have an outlet that can be controllably positioned relative to the other machine such that the seeds will be delivered desirably to the other machine. Seed conveyance subsystem 852 can include various other items 857 as well.

Communication system controller 829 controls communication system 806 to communicate data (e.g., sensor data generated by sensors 808, outputs of control system 814, etc.) to other items of agricultural system 300, such as one or more of remote user interface mechanisms 364, remote computing systems 367, mobile planting machine 100, and other mobile machine 370 over network 359.

Interface controller 830 is operable to generate control signals to control interface mechanisms, such as operator interface mechanisms 818 or user interface mechanisms 364, or both. The interface controller 830 is operable to cause an interface mechanism to present (e.g., display) data (e.g., sensor data generated by sensors 808, outputs of control system 314, alerts, notifications, etc.) to an operator 360 or a remote user 366, or both.

Seed quality processing system 840 can be similar to seed quality processing system 340. Seed quality processing system 840 illustratively generates seed quality characteristic values and seed quality values. Seed quality processing system 340 illustratively obtains (e.g., receives or retrieves) sensor data generated by sensors 808 (e.g., seed quality sensors 880) and obtains seed quality threshold and model data 391 and based thereon determines quality of seeds of seed handling machine 800 and generates, as an output, a seed quality value indicative of the determined seed quality. The seed quality value can be various types of values, such as a numerical and scaled value (e.g., a value out of 100 or out of 10), a textual and scaled value (e.g., A-F, high/medium/low, etc.) as well as various other types of values. Thus, it will be understood that seed quality processing system 840 can generate, as an output, seed quality values, each indicative of a quality of an individual seed.

Additionally, seed quality processing system 840 can generate, as an output, seed quality characteristic values based on the obtained sensor data generated by sensors 808 (e.g., seed quality sensors 880) and based on the obtained seed quality threshold and model data 391. For example, it may be useful to know values of individual seed quality characteristics in addition to, or alternatively to, values of seed quality. Thus, seed quality processing system 840 can generate, as an output, one or more of seed shape values, seed size values, seed orientation values, seed moisture values, seed nutrient content values, seed damage values, seed genotype values, seed temperature values, as well as various other seed quality characteristic values. The seed quality characteristic values can be various types of values, such as a numerical and scaled value (e.g., a value out of 100 or out of 10), a textual and scaled value (e.g., A-F, high/medium/low, etc.) as well as various other types of values. Thus, it will be understood that seed quality processing system 840 can generate, as an output, seed quality characteristic values, each indicative of a value of a different one of a plurality of seed quality characteristics of an individual seed.

As illustrated, control system 814 can include one or more seed removal controllers 831 that control the seed removal subsystem 850. For example, each device 851 may have a respective seed removal controller 831 or multiple devices 851 may be controlled by a single seed removal controller 831. Based on seed quality values or seed quality characteristic values, or both, output by seed quality processing system 840, as well as, in some examples, a seed quality threshold value or seed quality characteristic threshold value(s), or both, of data 391, seed removal controllers 331 can generate control signals to control seed removal subsystem 350 (e.g., control one or more devices 351 to actuate to direct compressed fluid at a seed) to remove seeds from a seed stream or to otherwise prevent seeds from being delivered to another machine (or some other location separate from machine 100). As previously mentioned, actuation of the device 851 may also direct a seed to a poor quality seed tank 864. The quality or quality characteristics, or both, of individual seeds of seed handling machine 800 can be determined by seed quality processing system 840 and based thereon, the device(s) 851 corresponding to each row unit can be individually controlled by seed removal controller(s) 831 to remove an individual seed from the seed stream or to otherwise prevent the individual seed from being delivered to another machine (or some other location separate from machine 800).

It will be noted that seed handling machine can include various other controllable subsystems 856 that can be controlled by various other controllers 841.

While the illustrated example of FIG. 11 shows that various components of agricultural system architecture 1300 are located on seed handling machine 800, it will be understood that in other examples one or more of the components illustrated on seed handling machine 800 in FIG. 11 can be located at other locations, such as one or more remote computing systems 367. For instance, one or more of data stores 802 and seed quality processing system 840 can be located remotely from mobile machine 100 but can communicate with seed handling machine 800 via communication system 306 and network 359. Thus, the seed quality values and the seed quality characteristic values may be generated at remote locations away from seed handling machine 800 and can be communicated to or otherwise accessed by seed handling machine 800 (or other items of agricultural system 1300) over network 359. The information used in the generation of the seed quality values and the seed quality characteristic values may be communicated or otherwise accessed over network 359, for example sensor data generated sensors 808 can be provided over network 359 to the remote locations. Similarly, data in a data store 802 located remotely from seed handling machine 800, can be communicated to machine 800 via communication system 806 and network 359. These are merely examples.

In some examples, control system 814, or components thereof (such as seed quality processing system 840) can be located remotely from seed handling machine 800 such as at remote computing systems 367. In other examples, a remote location, such as remote computing systems 368, may include a respective control system which generates control values that can be communicated to seed handling machine 800 and can be used by on-board control system 814 to control the operation of seed handling machine 800. These are merely examples.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, generators, and interactions. It will be appreciated that any or all of such systems, components, logic, generators, and interactions may be implemented by hardware items, such as one or more processors, one or more processors executing computer executable instructions stored in memory, memory, or other processing components, some of which are described below, that perform the functions associated with those systems, components, logic, generators, or interactions. In addition, any or all of the systems, components, logic, generators, and interactions may be implemented by software that is loaded into a memory and is subsequently executed by one or more processors or one or more servers or other computing component(s), as described below. Any or all of the systems, components, logic, generators, and interactions may also be implemented by different combinations of hardware, software, firmware, etc., some examples of which are described below. These are some examples of different structures that may be used to implement any or all of the systems, components, logic, generators, and interactions described above. Other structures may be used as well.

Figure 12:
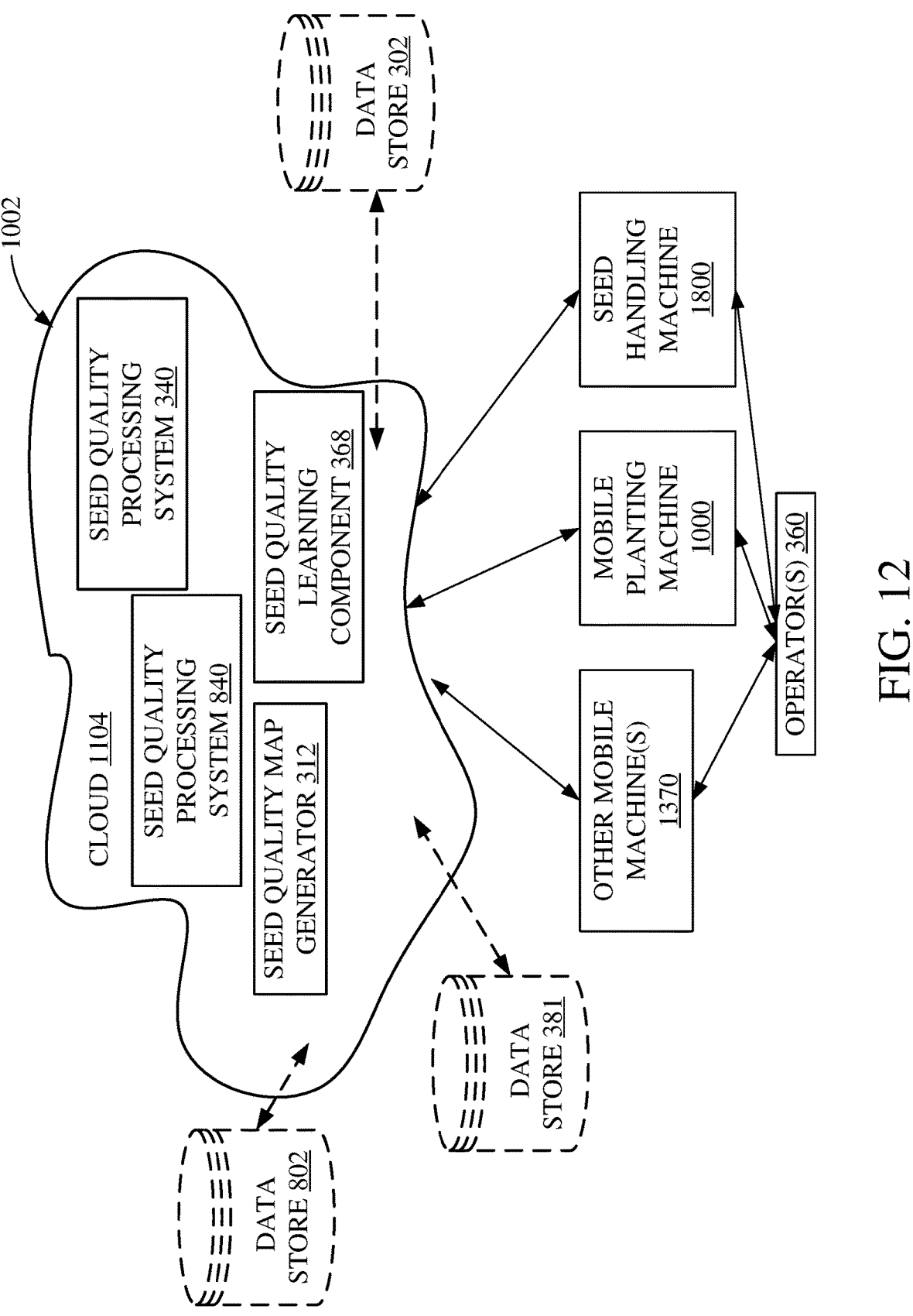
FIG. 12 is a block diagram showing one example of the architecture illustrated in FIG. 5, deployed in a remote server architecture.

FIG. 12 is a block diagram of mobile agricultural planting machine 1000, other mobile agricultural machines 1370, and seed handling machine 1800, which may be similar to mobile agricultural planting machine 100, other mobile agricultural machines 370, and seed handling machine 800, shown in previous figures, respectively. The mobile machine 1000, other mobile machines 1370, and seed handling machine 1800 communicate with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 12, some items are similar to those shown in previous figures and those items are similarly numbered. FIG. 12 specifically shows that one or more of seed quality map generator 312, seed quality processing system 340, seed quality processing system 840, and seed quality learning component 368 may be located at a server location 1004 that is remote from the mobile machine 1000 or the mobile machines 1370, or both. Therefore, in the example shown in FIG. 12, mobile machine 1000, mobile machines 1370, and seed handling machine 1800 access systems through remote server location 1004. In other examples, various other items may also be located at server location 1004, such as data store 302, data store 381, data store 802, data store of remote computing systems 367 (which may be one of other items 369), control system 314 (or components thereof), control system 372 (or components thereof), control system 814 (or components thereof), as well as various other items.

FIG. 12 also depicts another example of a remote server architecture. FIG. 12 shows that some elements of previous figures may be disposed at a remote server location 1004 while others may be located elsewhere. By way of example, one or more of data store 302, data store 381, data store 802, or a data store of remote computing systems 367 (which may one of other items 369) may be disposed at a location separate from location 1004 and accessed via the remote server at location 1004. Regardless of where the elements are located, the elements can be accessed directly by mobile machine 1000, mobile machines 1370, and seed handling machine 1800 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000, mobile machines 1370, or seed handling machine 1800 come close to the machine containing the information collection system, such as a fuel truck prior to fueling, the information collection system collects the information from the mobile machine 1000, the mobile machines 1370, or the seed handling machine 1800 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the mobile machine 1000, the mobile machines 1370, or the seed handling machine 1800 until the mobile machine 1000, the mobile machines 1370, or the seed handling machine 1800 enters an area having wireless communication coverage. The mobile machine 1000, itself, the mobile machines 1370, themselves, or the seed handling machine 1800, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 13:
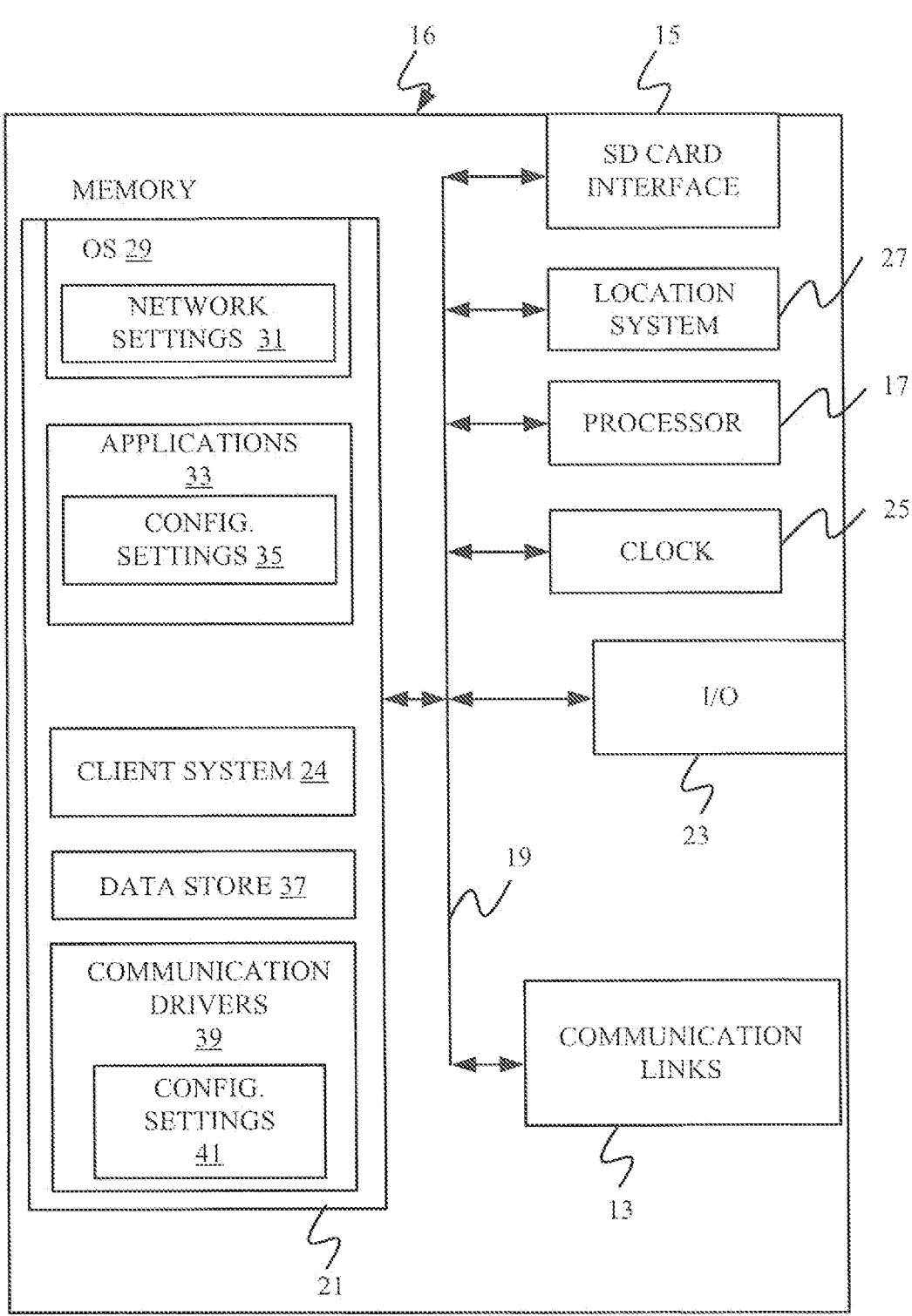
FIGS. 13-15 show examples of mobile devices that can be used in the architectures shown in previous figures.
Figure 14:
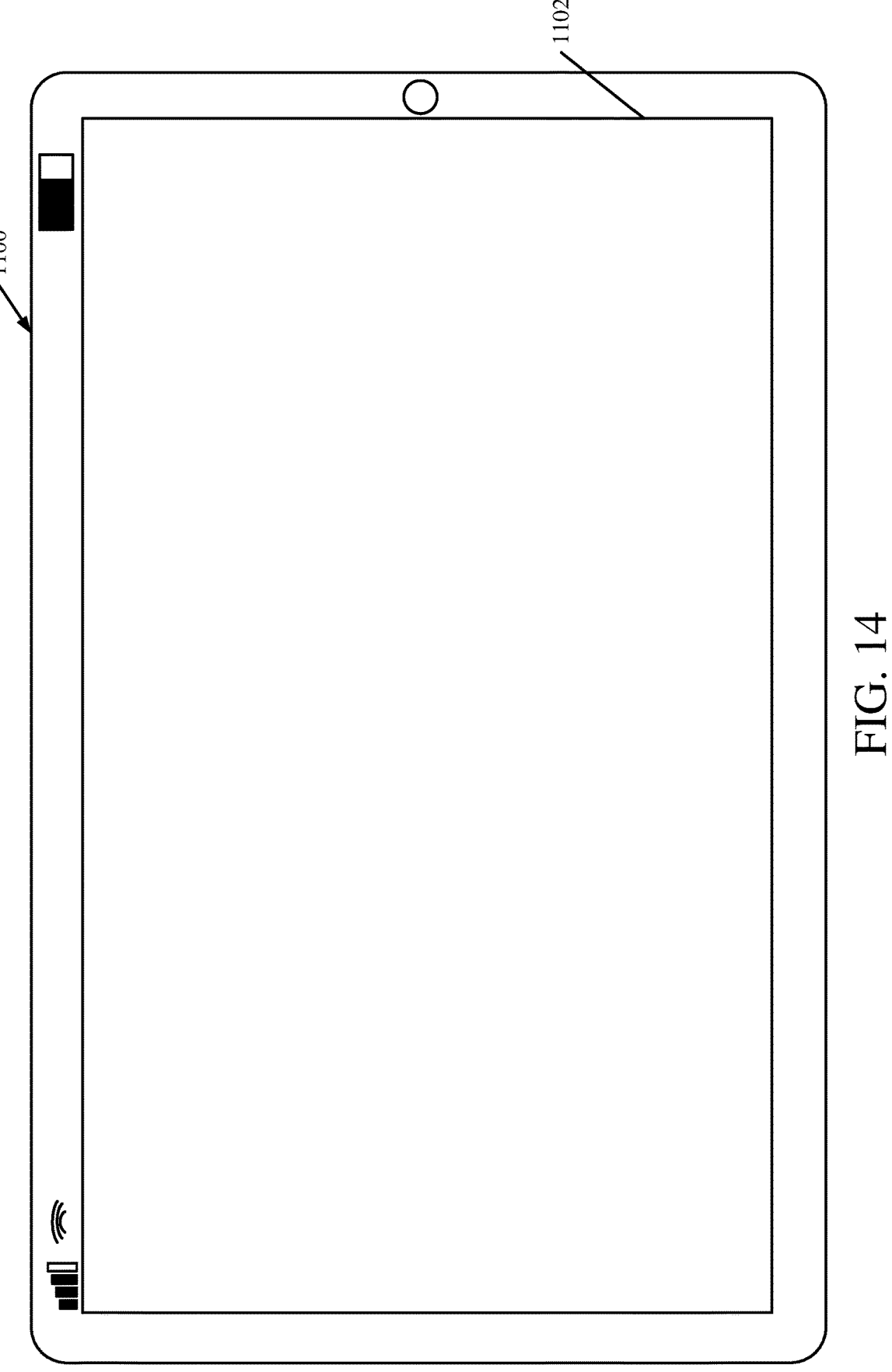
Figure 15:
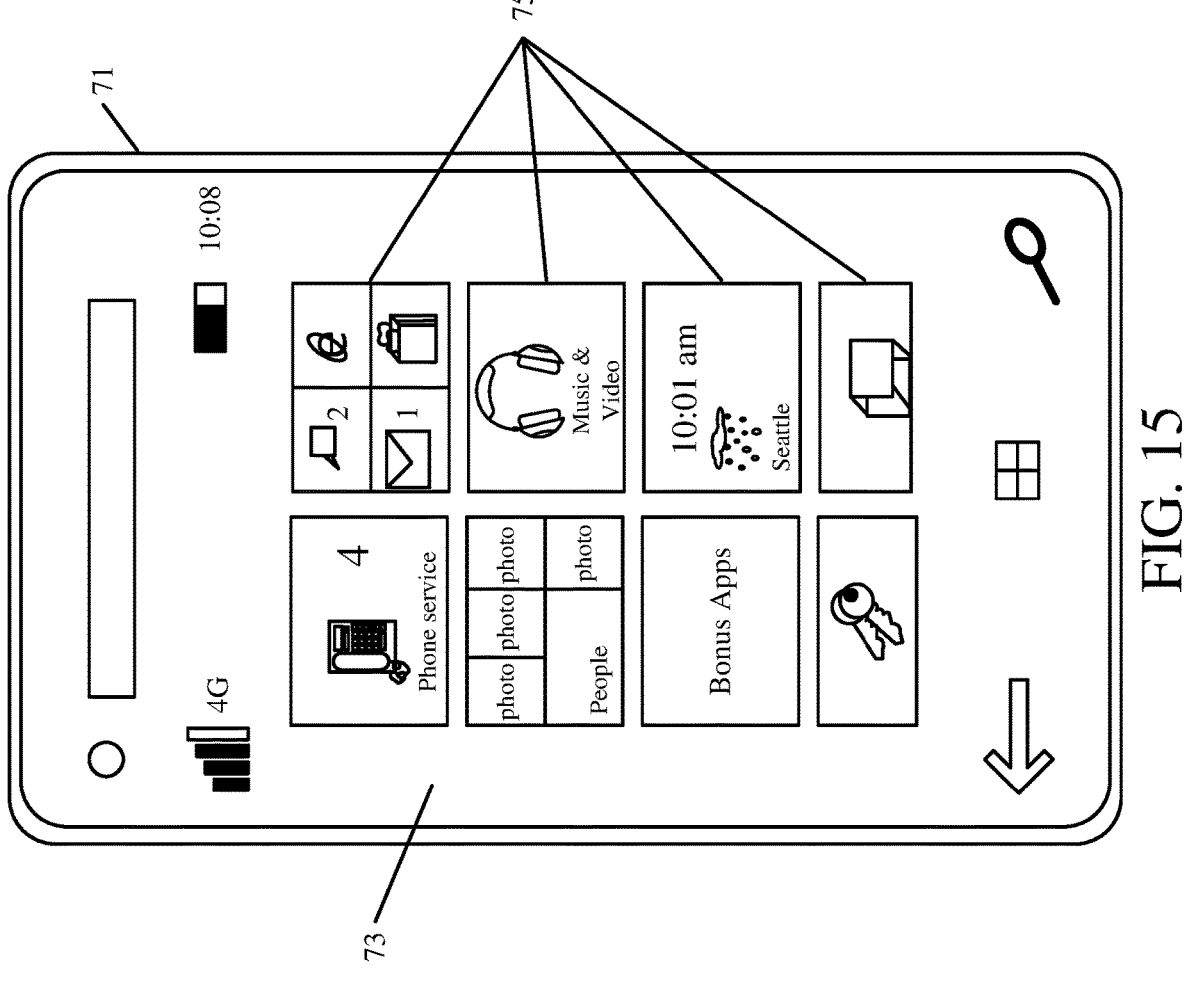

FIG. 13 is a simplified block diagram of one illustrative example of a handheld or mobile computing device that can be used as a user's or client's handheld device 16, in which the present system (or parts of it) can be deployed. For instance, a mobile device can be deployed in the operator compartment of mobile machine 100 for use in generating, processing, or displaying the maps discussed above. FIGS. 14-15 are examples of handheld or mobile devices.

FIG. 13 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures described herein)

along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 14 shows one example in which device 16 is a tablet computer 1100. In FIG. 14, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 15 is similar to FIG. 14 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
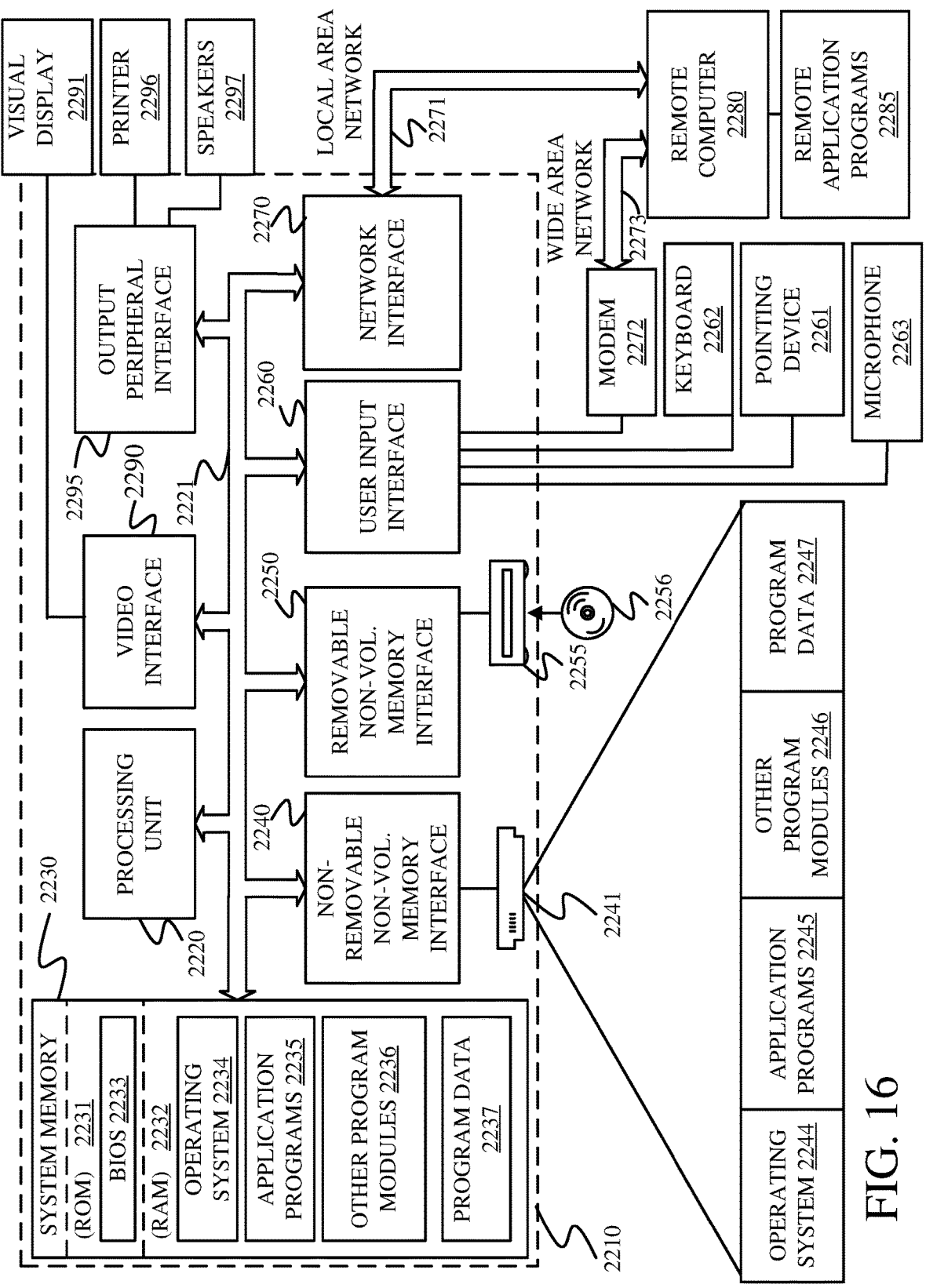
FIG. 16 is a block diagram showing one example of a computing environment that can be used in the architectures shown in the previous figures.

FIG. 16 is one example of a computing environment in which elements of previous figures described herein can be deployed. With reference to FIG. 16, an example system for implementing some embodiments includes a computing device in the form of a computer 2210 programmed to operate as discussed above. Components of computer 2210 may include, but are not limited to, a processing unit 2220 (which can comprise processors or servers from previous figures described herein), a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. Memory and programs described with respect to previous figures described herein can be deployed in corresponding portions of FIG. 16.

Computer 2210 typically includes a variety of computer readable media. Computer readable media may be any available media that can be accessed by computer 2210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 2230 includes computer storage media in the form of volatile and/or nonvolatile memory or both such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data or program modules or both that are immediately accessible to and/or presently being operated on by processing unit 2220. By way of example, and not limitation, FIG. 16 illustrates operating system 2234, application programs 2235, other program modules 2236, and program data 2237.

The computer 2210 may also include other removable/non-removable volatile/nonvolatile computer storage media. By way of example only, FIG. 16 illustrates a hard disk drive 2241 that reads from or writes to non-removable, nonvolatile magnetic media, an optical disk drive 2255, and non-volatile optical disk 2256. The hard disk drive 2241 is typically connected to the system bus 2221 through a non-removable memory interface such as interface 2240, and optical disk drive 2255 are typically connected to the system bus 2221 by a removable memory interface, such as interface 2250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 2210. In FIG. 16, for example, hard disk drive 1241 is illustrated as storing operating system 2244, application programs 2245, other program modules 2246, and program data 2247. Note that these components can either be the same as or different from operating system 2234, application programs 2235, other program modules 2236, and program data 2237.

A user may enter commands and information into the computer 2210 through input devices such as a keyboard 2262, a microphone 2263, and a pointing device 2261, such as a mouse, trackball or touch pad. Other input devices (not shown) may include a joystick, game pad, satellite dish, scanner, or the like. These and other input devices are often connected to the processing unit 2220 through a user input interface 2260 that is coupled to the system bus, but may be connected by other interface and bus structures. A visual display 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 is operated in a networked environment using logical connections (such as a controller area network-CAN, local area network-LAN, or wide area network WAN) to one or more remote computers, such as a remote computer 2280.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. In a networked environment, program modules may be stored in a remote memory storage device. FIG. 16 illustrates, for example, that remote application programs 2285 can reside on remote computer 2280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
   one or more seed quality sensors configured to detect a seed within a row unit of an agricultural planting machine and to generate sensor data indicative of a quality of the detected seed;
   one or more processors; and
   a data store configured to store computer executable instructions that, when executed by the one or more processors, configure the one or more processors to:
   determine a quality of the seed based on the sensor data and to generate a seed quality value indicative of the determined seed quality;
   control the agricultural planting machine based on the generated seed quality value;
   obtain data indicative of a crop characteristic of a crop resulting from the seed; and
   generate a seed quality learning output based on the data indicative of the crop characteristic of the crop resulting from the seed, wherein the seed quality learning output comprises one of: (i) an adjustment to a seed quality threshold value; (ii) an adjustment to a control algorithm; or (iii) an adjustment to a seed quality value determination algorithm.

2. The agricultural system of claim 1, wherein the one or more seed quality sensors comprise one or more of:
   a reflective sensor;
   a camera;
   a thermal sensor;
   an infrared sensor,
   a near infrared (NIR) sensor; and
   an x-ray sensor.

3. The agricultural system of claim 1, wherein the sensor data, indicative of the quality of the seed, indicates one or more of:
   a size of the seed;
   a shape of the seed;
   an orientation of the seed;
   a color of the seed;
   seed damage;
   seed temperature;
   seed moisture; and
   seed nutrient content.

4. The agricultural system of claim 1, wherein the computer executable instructions, when executed by the one or more processors, configure the one or more processors to further:
   generate a control signal to control a seed removal subsystem to prevent the seed from being delivered to a furrow generated by the row unit based on the seed quality value.

5. The agricultural system of claim 1, wherein the computer executable instructions, when executed by the one or more processors, configure the one or more processors to further:
   generate a control signal to adjust a speed of a seed metering system based on the seed quality value.

6. The agricultural system of claim 1, wherein the computer executable instructions, when executed by the one or more processors, configure the one or more processors to further:
   generate a control signal to adjust a speed of a seed delivery system based on the seed quality value.

7. The agricultural system of claim 1, wherein the computer executable instructions, when executed by the one or more processors, configure the one or more processors to further:
   generate a seed quality map that includes seed quality values georeferenced to different locations in a worksite based on the sensor data and based on geographic location data indicative of a location of the agricultural planting machine.

8. The agricultural system of claim 1 and further including another agricultural machine including:
   a controllable subsystem; and
   wherein the computer executable instructions, when executed by the one or more processors, configure the one or more processors to further:
   generate a control signal to control the controllable subsystem based on the seed quality value.

9. The agricultural system of claim 1, wherein the data indicative of the crop characteristic of the crop resulting from the seed comprises sensor data generated by a sensor of another mobile agricultural machine, different than the agricultural planting machine.

10. A computer implemented method of controlling a mobile agricultural planting machine, the computer implemented method comprising:

obtaining sensor data indicative of a quality of a seed of a row unit, wherein the sensor data, indicative of the quality of the seed, indicates one or more of seed temperature and seed nutrient content;

generating a seed quality value based on the sensor data; and controllably actuating a device of the mobile agricultural planting machine, based on the generated seed quality value, to direct compressed fluid at the seed to prevent the seed from being deposited in a furrow generated by the row unit.

11. The computer implemented method of claim 10, wherein controlling the mobile agricultural planting machine based on the generated seed quality value further comprises one or more of:

controllably adjusting a speed of a seed metering system, of the mobile agricultural planting machine; and controllably adjusting a speed of a seed delivery system, of the mobile agricultural planting machine.

12. The computer implemented method of claim 10 and further comprising:

generating a seed quality map that maps the seed quality value at a geographic location in a worksite to which the seed quality value corresponds; and wherein controlling the mobile agricultural planting machine based on the seed quality value comprises controlling the mobile agricultural planting machine based on the seed quality value in the seed quality map.

13. The computer implemented method of claim 12 and further comprising:

obtaining sensor data indicative of a crop characteristic of a crop resulting from the seed; and generating a seed quality learning output based on the sensor data indicative of the crop characteristic of the crop resulting from the seed.

14. A computer implemented method of controlling a mobile agricultural planting machine, the computer implemented method comprising:

obtaining sensor data indicative of a quality of a seed of a row unit from one or more seed quality sensors of the mobile agricultural planting machine, wherein the sensor data, indicative of the quality of the seed, indicates one or more of seed temperature and seed nutrient content;

generating a seed quality value based on the sensor data; and controlling a controllable subsystem of a mobile agricultural machine based on the seed quality value, the mobile agricultural machine different than the mobile agricultural planting machine.

15. A mobile agricultural planting machine comprising:
a row unit configured to open a furrow in a field;
a seed supply system that delivers a seed to the furrow;
one or more seed quality sensors that observe the seed in the seed supply system and generate sensor data indicative of a plurality of different quality characteristics of the seed; and
a control system configured to:
    generate a singular seed quality value indicative of a quality of the seed based on the sensor data indicative of the plurality of different quality characteristics of the seed and a seed quality model; and
    generate a control signal based on the singular seed quality value.

16. A mobile agricultural planting machine comprising:
a row unit configured to open a furrow in a field;
a seed supply system that delivers a seed to the furrow;
one or more seed quality sensors that observe the seed in the seed supply system and generate sensor data indicative of a quality of the seed; and
a control system configured to:
    generate a seed quality value indicative of a quality of the seed based on the sensor data indicative of the quality of the seed and a seed quality model; and
    generate a control signal based on the seed quality value to actuate a device to direct compressed air at the seed to prevent the seed from being delivered to the furrow.

17. The mobile agricultural planting machine of claim 16, wherein the control system is further configured to generate an additional control signal to control a speed at which a component of the seed supply system operates.

18. A mobile agricultural planting machine comprising:
a row unit configured to open a furrow in a field;
a seed supply system that delivers a seed to the furrow;
one or more seed quality sensors that observe the seed in the seed supply system and generate sensor data indicative of a quality of the seed; and
a control system configured to:
    generate a seed quality value indicative of a quality of the seed based on the sensor data indicative of the quality of the seed and a seed quality model; and
    generate a control signal based on the seed quality value, wherein the control system is further configured to obtain sensor data indicative of a geographic location of the mobile agricultural planting machine and to generate the seed quality value as a georeferenced seed quality value indicative of quality of the seed georeferenced to a location in the field based on the sensor data indicative of the quality of the seed and the sensor data indicative of the geographic location of the mobile agricultural planting machine, the mobile agricultural planting machine further comprising:
    a seed quality map generator configured to generate a seed quality map of the field that maps the georeferenced seed quality value to its location in the field; and
a communication system configured to provide seed quality map to a different machine, separate from the mobile agricultural planting machine.

* * * * *